US010432571B2

United States Patent
Bhagwan et al.

(10) Patent No.: US 10,432,571 B2
(45) Date of Patent: Oct. 1, 2019

(54) AUTOMATED CONNECTION OF ELECTRONIC MESSAGING AND SOCIAL NETWORKING SERVICES METHOD AND APPARATUS

(71) Applicant: OATH INC., New York, NY (US)

(72) Inventors: Varun Bhagwan, San Jose, CA (US); Doug Sharp, San Francisco, CA (US); Suhas Sadanandan, Pleasanton, CA (US); Sindhuja Sridharan, Mountain View, CA (US)

(73) Assignee: OATH INC., New York, NY (US)

( * ) Notice: Subject to any disclaimer, the term of this patent is extended or adjusted under 35 U.S.C. 154(b) by 196 days.

(21) Appl. No.: 15/238,278

(22) Filed: Aug. 16, 2016

(65) Prior Publication Data

US 2018/0054410 A1    Feb. 22, 2018

(51) Int. Cl.
*H04L 12/58* (2006.01)
*H04L 29/08* (2006.01)
*H04W 4/21* (2018.01)

(52) U.S. Cl.
CPC ............ *H04L 51/32* (2013.01); *H04L 51/18* (2013.01); *H04L 67/146* (2013.01); *H04W 4/21* (2018.02)

(58) Field of Classification Search
CPC ... H04W 4/21; H04L 51/32; H04M 2203/655; H04B 7/18526
See application file for complete search history.

(56) References Cited

U.S. PATENT DOCUMENTS

| | | | |
|---|---|---|---|
| 8,949,343 B2 | 2/2015 | Shen et al. | |
| 9,092,759 B2 | 7/2015 | Hammer et al. | |
| 9,105,044 B2 | 8/2015 | Wu | |
| 9,269,081 B1* | 2/2016 | Panzer | G06Q 50/01 |

(Continued)

OTHER PUBLICATIONS

Constant Contact Cummunity. "How Do You Add a Facebook "Like" Button to Your Email?" located at https://community.constantcontact.com/t5/E-mail-Marketing/How-do-you-add-a-Facebook-quot-Like-quot-button-to-your-email/td-p/112, Constant Contact, Inc (2015).

(Continued)

*Primary Examiner* — Aftab N. Khan
(74) *Attorney, Agent, or Firm* — James J. DeCarlo; Greenberg Traurig, LLP

(57) ABSTRACT

Disclosed are systems and methods for improving interactions with and between electronic mail services and other services, such as social networking service and/or providing systems supported by or configured with personal computing devices, servers and/or platforms. The systems interact to identify and retrieve data within or across platforms, which can be used to improve the quality of data used in processing interactions between or among processors in such systems. The disclosed systems and methods provide systems and methods for automatic linking of an electronic messaging service and another service, such as a social networking service. The disclosed systems and methods form a connection between an electronic messaging system and another service external to the electronic messaging system and uses the formed link to perform a number of actions on behalf of the user of the electronic messaging system and the other service.

18 Claims, 12 Drawing Sheets

(56) References Cited

U.S. PATENT DOCUMENTS

| | | | | |
|---|---|---|---|---|
| 2009/0292814 | A1* | 11/2009 | Ting | G06F 15/16 |
| | | | | 709/229 |
| 2010/0333019 | A1* | 12/2010 | Oschwald | G06Q 30/02 |
| | | | | 715/810 |
| 2011/0246574 | A1* | 10/2011 | Lento | G06Q 10/10 |
| | | | | 709/204 |
| 2011/0252108 | A1* | 10/2011 | Morris | H04L 51/32 |
| | | | | 709/206 |
| 2012/0226749 | A1* | 9/2012 | Dale | G06Q 50/01 |
| | | | | 709/204 |
| 2013/0166653 | A1* | 6/2013 | Sherrets | G06Q 30/02 |
| | | | | 709/204 |
| 2013/0317994 | A1* | 11/2013 | Tran | G06Q 50/184 |
| | | | | 705/310 |
| 2013/0325869 | A1* | 12/2013 | Reiley | G06F 17/30035 |
| | | | | 707/741 |
| 2016/0255035 | A1* | 9/2016 | Fritsch | H04L 51/32 |
| | | | | 709/206 |
| 2017/0366497 | A1* | 12/2017 | Feng | H04L 51/32 |

OTHER PUBLICATIONS

Dotmailer. "How to Trigger Social Actions From Your Email Campaign," located at http://blog.dotmailer.com/how-to-trigger-social-actions-from-your-email-campaign/VgWy1I9Viko, Dec. 16, 2015.

* cited by examiner

```
function postLike () {
    var accessToken = getUserAccessToken();
    /*For example;
    ** var objectToLike = "http://www.businessinsider.com/iihs-headlight-study-poor-bmw-prius-2016-3"
    ** or
    ** The link to the object's <a href=""> which was received in the email notification
    */
    objectToLike = "article link obtained from the email notification";
    if (accessToken) {
        FB.api(
            'https://graph.facebook.com/me/og.likes',
            'post',
            {
                object: objectToLike,
                function (response) {
                    if (!response) {
                        alert('Error Occurred on Like');
                    } else if (response.error) {
                        display error message to user
                    } else {
                        liked the FB notification successful
                    }
                }
            }
        );
    }
};
```

602 — (first brace group)
604 — (second brace group)

Figure 6

AUTOMATED CONNECTION OF ELECTRONIC MESSAGING AND SOCIAL NETWORKING SERVICES METHOD AND APPARATUS

FIELD OF THE DISCLOSURE

The present disclosure relates to electronic messaging services, such as electronic mail services, and more particularly relates to a capability of an electronic messaging service provider to facilitate user interaction with a social networking service, via a reference to the social networking service in an electronic message, such as electronic mail, directed to the user via the electronic message service.

BACKGROUND

A social networking service, such as Facebook® and LinkedIn®, sends a huge volume of electronic messages, such as electronic mail messages, to electronic messaging service users. Many times, an electronic message from a social networking service contains a reference, such as a universal resource locator (URL) which is intended to direct the user to the social networking service. For example, a social networking service user may use an electronic mail service to view an electronic message originating from a social networking service and containing a prompt (with an associated URL) that when selected by the user opens a web page of the social networking service or opens a client application of the social networking service. The user's selection of the prompt effectively directs the user away from the electronic messaging service thereby reducing the user's use of the electronic messaging service.

SUMMARY

The present disclosure provides novel systems and methods for automatic linking of an electronic messaging service and another service, such as a social networking service. The disclosed systems and methods form an automated and heretofore unavailable connection between an electronic messaging system and another service external to the electronic messaging system and uses the formed connection to perform a number of actions on behalf of the user of the electronic messaging system and the other service.

Examples of an electronic message include an electronic mail message, an instant message, a short message, a multimedia message, and the like. Examples of an electronic message service include an electronic mail service, a short message service (SMS), a multimedia message service (MMS), and the like. Examples of services to which an electronic messaging service is automatically connected (or linked), include Facebook®, LinkedIn®, Quora®, Netflix® or the like.

An electronic message is typically directed to a user via an electronic messaging service using the user's account with the electronic messaging service. The electronic message received by a user of the electronic messaging service via the electronic messaging service can include a universal resource locator (URL), or other reference or link, to another service external to the electronic messaging service, such as a social networking service (e.g., Facebook®). The electronic message, e.g., an electronic mail message, might be sent by the service itself as an alert, or notification, to a user. For example, a social networking service might transmit an electronic message to a user of the social networking service alerting the user to an event that occurred in connection with the social networking service. The electronic message typically includes a URL that when selected directs the user to the social networking service so that the user can take an action with the social networking service. As another example, in addition to an electronic message originating from the social networking service itself, the electronic message that is directed to the user via the electronic messaging service may be from another source, e.g., an online merchant. In any case, the electronic message that is directed to the user via the electronic messaging service can include a URL, or other reference, that when selected directs the user to the social networking service.

As one non-limiting example, the electronic message can be an electronic mail message that is sent to the email address (account) that the user has with the electronic messaging service. The email address can be supplied to the social networking service, or other service, by the user as part of the user's registration with the social networking service (or other service) or some other time. By way of some non-limiting examples, the email might notify the user that the user is invited to an event and prompt the user to RSVP to the invitation, prompt the user to view shared content and/or to share content with other users of the social networking service, prompt the user to like an object (e.g., a post, tag, or the like) in the social networking service, prompt the user to make a comment, prompt the user to provide feedback or other information (e.g., a question and/or answer in connection with a question and answer service), etc.

The electronic message sent to the user's electronic mail address can be accessed by the user using the electronic mail service's client application or using a web site of a provider of the electronic messaging service. The electronic message typically includes a URL, or other reference or link, that is selectable by the user and (if selected) directs the user to the social networking service (or other service), e.g., a web page or client application of the social networking service (or other service). User selection of the link typically results in a web page of the social networking service (other service) being opened in a browser application executing on the client computing device of the user, or a client application of the social networking service (or other service) being opened on the client computing device. In either case, the display of the client computing device of the user changes from displaying the web page (or client application graphical user interface (or user interface or UI) of the electronic messaging service to displaying a user interface of the social networking service (or other service).

Selection of the URL effectively turns the attention of the user away from the electronic messaging service and to the other service. This reduces user engagement with the electronic mail service, decreases marketing potential for the electronic mail service provider, and negatively impacts customer relations of the electronic message service provider with new and existing customers. In addition, the existing paradigm expends networking resources, server computing device resources and client computing device resources needed to display the other service's user interface at the client computing device.

The disclosed systems and methods described herein provide an automated connection (linking) of the electronic messaging service and at least one other service, such that the action intended to be performed by the user is automatically performed for the user on the user's behalf; and, there is no need for the user to navigate to the other service and use the other service's user interface to perform the action. The automated connection simplifies the social networking service operation, which promotes the user's engagement in the social networking service, while the ability to perform the social networking service operations without leaving the environment of the electronic messaging service promotes the user's engagement in the electronic messaging service. In addition, the automated connection of the electronic messaging and social networking services described herein reduces the networking and computing resources needed to effectuate the messaging and social network functions while still responding to the prompt(s) of the social networking service contained in an electronic message. Accordingly, the disclosed technology herein provides improvements to existing technologies, including electronic messaging and social networking technologies, and reduces the expenditure of network resources, client computing resources and server computing resources.

According to some embodiments, the disclosed systems and methods first receives an electronic message addressed to a user of the electronic messaging service, the received message includes a user-selectable prompt with an associated link to direct the user to a social networking service. Input from the user selecting the associated link directed to the social networking service is intercepted by a connection service which automatically makes a connection to the social networking service to perform a number of actions indicated by the user-selectable prompt. The connection service obtains and stores an authorization to access the user's social networking service data on the user's behalf, accesses the social networking service data, (e.g., reads, updates, or adds data) on the user's behalf using the obtained authorization to request each action of the number of actions indicated by the user-selectable prompt, receives a response from the social networking service indicating the status of the requested action and provides feedback to the user within a user interface of the electronic messaging service.

To further illustrate, assume that the received electronic message contained a "Like" prompt, e.g., a prompt for the user to "Like" a Facebook® object, such as a post. Conventionally, the user's selection of the "Like" prompt in the received electronic message results in the Facebook® user interface being displayed (e.g., in a web page displayed in a browser application or a user interface of a client application) at the user's computing device in response. If the user is not yet logged in, the Facebook® user interface prompts the user to log in before the user is presented with the Facebook® post and the "Like" prompt in the Facebook® user interface.

According to some embodiments, the disclosed systems and methods act on the user's behalf in response to receiving the input indicating the user's selection of the "Like" prompt in the electronic message. A connection service automatically makes an automated connection, e.g., via an application programming interface (API), with Facebook®. Using the automated connection, the connection service makes a request for the action to be performed to update the database, or other data store, maintained by Facebook®. For example, the connection service transmits an invocation of a function (e.g., og.likes) of the API to request performance of the "Like" operation on behalf of the user with respect to an object identified in the invocation. The transmitted invocation includes an access token, such as a long-lived access token, indicating the user's authorization (or permission) for the connection service to request performance of the action on the user's behalf.

Using the automated connection established by the connection service, a reply is received from Facebook®, which provides the connection service with feedback indicating the status of the connection service's request. The connection service causes the user interface (e.g., a user interface provided by a browser application displaying a web page of the electronic messaging service or a user interface provided by a client application to display electronic messages from the electronic messaging service) to be updated with one or more updates in response to the user's selection of the "Like" prompt. For example, the user interface can be caused to provide an initial update confirming receipt of the user's selection of "Like" prompt, and to provide a notification that the "Like" action is being initiated, on the user's behalf, with Facebook®. Then, when a reply is received from Facebook®, the user interface can be caused to provide feedback indicating whether or not the "Like" action was successfully performed. Using the connection service provided in accordance with embodiments of the present disclosure, the user need not be redirected to Facebook®, and the "Like" action requested by the user from within the email is performed automatically by the connection service on the user's behalf with Facebook®. The user can remain engaged with the electronic messaging service while the operation is being performed for the user by the connection service. Furthermore, there is no need for the user to interact with Facebook®, since the connection service interacts with Facebook®, and performs the action, on behalf of the user.

It will be recognized from the disclosure herein that embodiments of the instant disclosure provide improvements to a number of technology areas, for example those related to systems and processes that handle or process electronic mail content and deliver such content to users over the internet, as well as social networking systems and services that communicate with users via electronic messaging systems and services. The disclosed systems and methods can effectuate increased ease and efficiency in the ways that users can access and interact with electronic messaging and social networking content, as the disclosed systems and methods, inter alia, automatically connect (or link) electronic messaging service with at least one other service. Users are provided with a fully automated experience through the disclosed systems' and methods' automatic connection between electronic messaging and social networking services. For example, the disclosed automated connection between electronic messaging and other services avoids users having to access the other service to perform an operation with the service, as the disclosed systems and methods can automatically perform the operation with the other service on a user's behalf in response to the user's selection of prompt (referencing the other service) in an electronic message accessed by the user using an electronic messaging service, thus improving user engagement with both the electronic messaging service and the other service.

In accordance with one or more embodiments, a method is disclosed which includes receiving, at a computing device, input from a user via a user interface display of an electronic message directed to the user via an electronic messaging service, the input indicating a selection by the user of a universal resource locator (URL) contained in the electronic message, the user-selected URL in the electronic message identifying a social networking service and an action to be performed with the social networking service; determining, via the computing device and using the URL, the action to be performed with the social networking service; automatically forming a connection, via the computing device, with the social networking service and by a connection service of the electronic messaging service; transmitting, via the computing device and by the connection service using the formed connection between the connection service of the electronic messaging service and the social networking service, a request on behalf of the user, the request requesting that the social networking service perform the determined action; receiving, via the computing device and by the connection service of the electronic messaging service using the formed connection between the connection service and the social networking service, a reply from the social networking service; and causing, via the computing device and as a response to the selection by the user of a universal resource locator (URL) contained in an electronic message presented in the user interface of the electronic messaging service, the user interface to be updated to include information in accordance with the reply received from the social networking service.

In accordance with one or more embodiments, a non-transitory computer-readable storage medium is provided, the non-transitory computer-readable storage medium tangibly storing thereon, or having tangibly encoded thereon, computer readable instructions that when executed cause at least one processor to perform a method for automatically form an automated connection between an electronic messaging service an another service and transmitting a request for an action to be taken on behalf of a user of the electronic messaging service and the other service in response to the user's selection (in an electronic message of the electronic messaging service) of a URL identifying the other service and the action.

In accordance with one or more embodiments, a system is provided that comprises one or more computing devices configured to provide functionality in accordance with such embodiments. In accordance with one or more embodiments, functionality is embodied in steps of a method performed by at least one computing device. In accordance with one or more embodiments, program code (or program logic) executed by a processor(s) of a computing device to implement functionality in accordance with one or more such embodiments is embodied in, by and/or on a non-transitory computer-readable medium.

DRAWINGS

The foregoing and other objects, features, and advantages of the disclosure will be apparent from the following description of embodiments as illustrated in the accompanying drawings, in which reference characters refer to the same parts throughout the various views. The drawings are not necessarily to scale, emphasis instead being placed upon illustrating principles of the disclosure:

Figure 10:
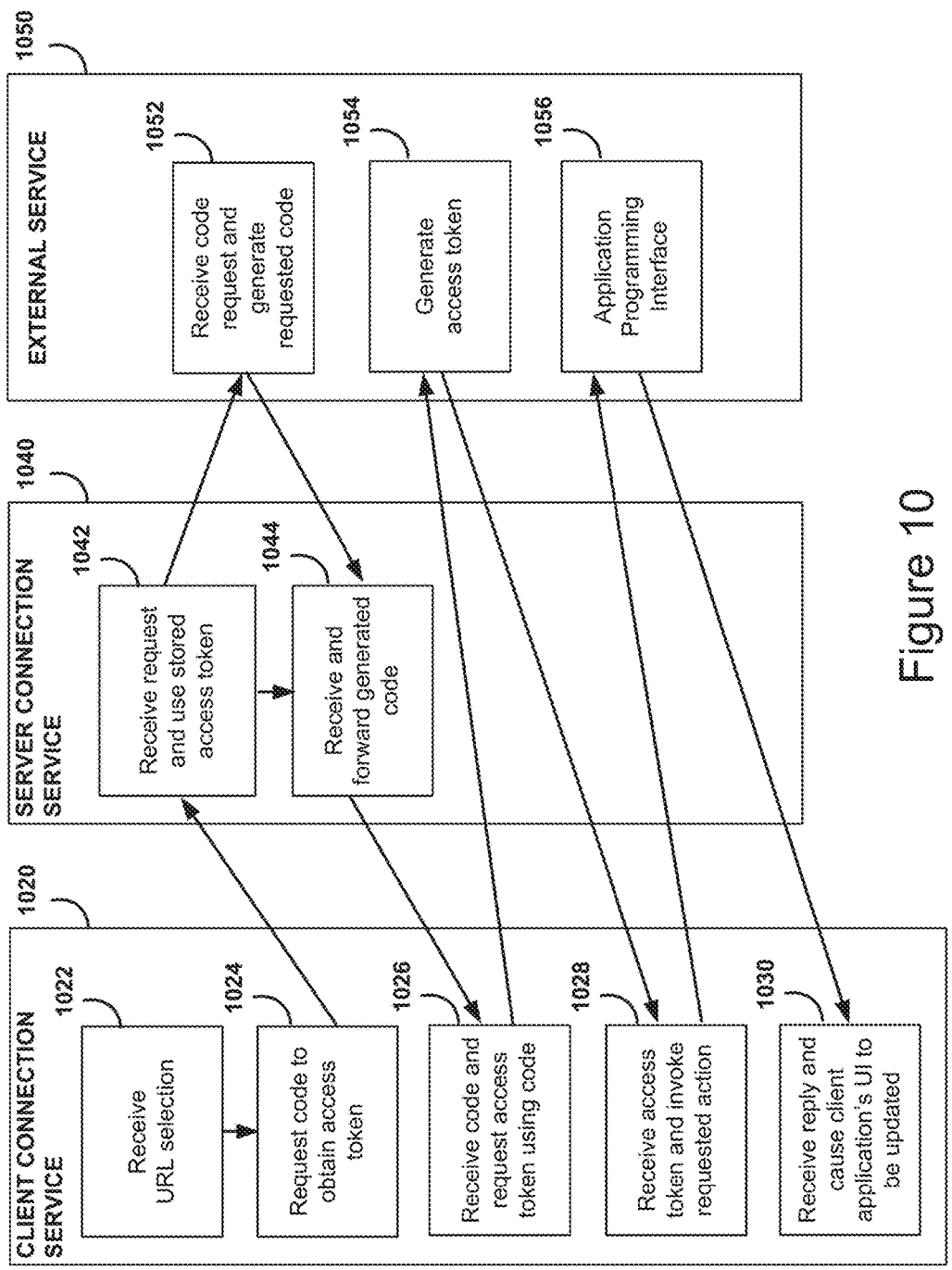
Figure 11:
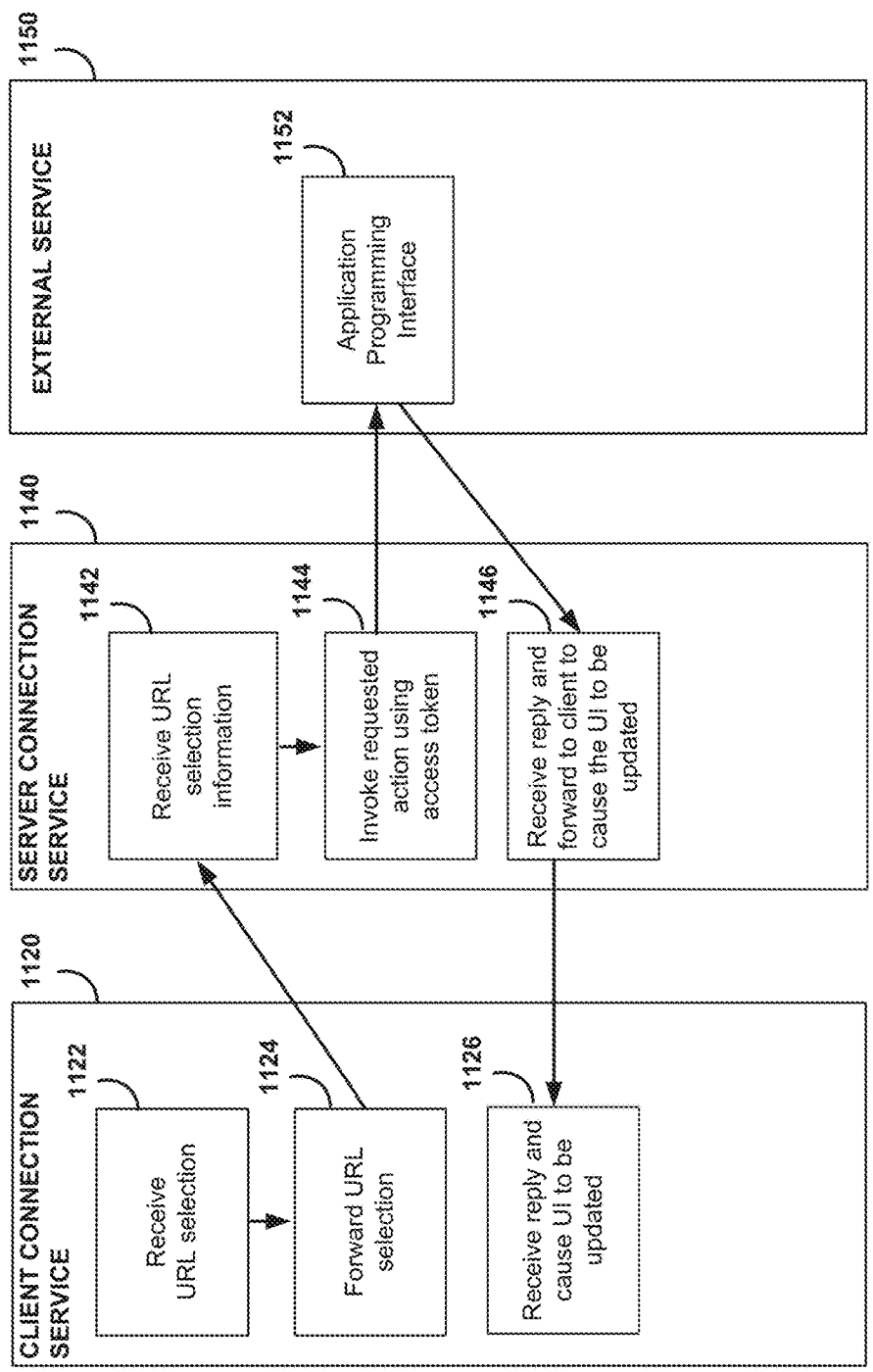
Figure 12:
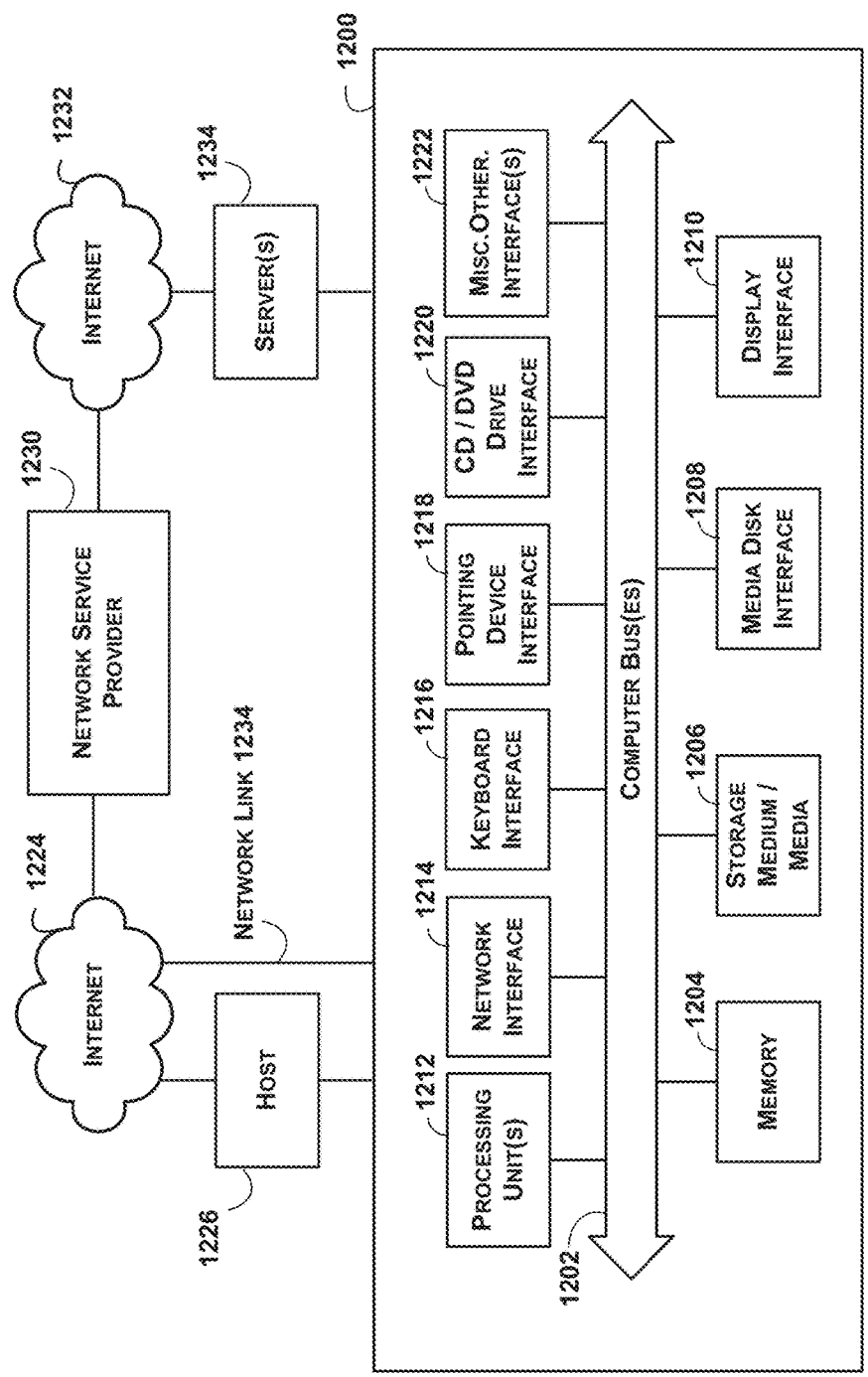

FIGS. 5 and 7-9 each provide an exemplary user interface example of a non-limiting embodiment in accordance with some embodiments of the present disclosure;

FIG. 6 provides a pseudocode example of a non-limiting embodiment in accordance with some embodiments of the present disclosure;

FIG. 10 is a schematic diagram of a component interaction example of a non-limiting embodiment in accordance with some embodiments of the present disclosure;

FIG. 11 is another schematic diagram of a component interaction example of a non-limiting embodiment in accordance with some embodiments of the present disclosure; and FIG. 12 is a block diagram illustrating the architecture of an exemplary hardware device in accordance with one or more embodiments of the present disclosure.

DETAILED DESCRIPTION

Subject matter will now be described more fully hereinafter with reference to the accompanying drawings, which form a part hereof, and which show, by way of illustration, specific example embodiments. Subject matter may, however, be embodied in a variety of different forms and, therefore, covered or claimed subject matter is intended to be construed as not being limited to any example embodiments set forth herein; example embodiments are provided merely to be illustrative. Likewise, a reasonably broad scope for claimed or covered subject matter is intended. Among other things, for example, subject matter may be embodied as methods, devices, components, or systems. Accordingly, embodiments may, for example, take the form of hardware, software, firmware or any combination thereof (other than software per se). The following detailed description is, therefore, not intended to be taken in a limiting sense.

Throughout the specification and claims, terms may have nuanced meanings suggested or implied in context beyond an explicitly stated meaning. Likewise, the phrase "in one embodiment" as used herein does not necessarily refer to the same embodiment and the phrase "in another embodiment" as used herein does not necessarily refer to a different embodiment. It is intended, for example, that claimed subject matter include combinations of example embodiments in whole or in part.

In general, terminology may be understood at least in part from usage in context. For example, terms, such as "and", "or", or "and/or," as used herein may include a variety of meanings that may depend at least in part upon the context in which such terms are used. Typically, "or" if used to associate a list, such as A, B or C, is intended to mean A, B, and C, here used in the inclusive sense, as well as A, B or C, here used in the exclusive sense. In addition, the term "one or more" as used herein, depending at least in part upon context, may be used to describe any feature, structure, or characteristic in a singular sense or may be used to describe combinations of features, structures or characteristics in a plural sense. Similarly, terms, such as "a," "an," or "the," again, may be understood to convey a singular usage or to convey a plural usage, depending at least in part upon context. In addition, the term "based on" may be understood as not necessarily intended to convey an exclusive set of factors and may, instead, allow for existence of additional factors not necessarily expressly described, again, depending at least in part on context.

The present disclosure is described below with reference to block diagrams and operational illustrations of methods and devices. It is understood that each block of the block diagrams or operational illustrations, and combinations of blocks in the block diagrams or operational illustrations, can be implemented by means of analog or digital hardware and computer program instructions. These computer program instructions can be provided to a processor of a general purpose computer to alter its function as detailed herein, a special purpose computer, ASIC, or other programmable data processing apparatus, such that the instructions, which execute via the processor of the computer or other programmable data processing apparatus, implement the functions/acts specified in the block diagrams or operational block or blocks. In some alternate implementations, the functions/acts noted in the blocks can occur out of the order noted in the operational illustrations. For example, two blocks shown in succession can in fact be executed substantially concurrently or the blocks can sometimes be executed in the reverse order, depending upon the functionality/acts involved.

These computer program instructions can be provided to a processor of: a general purpose computer to alter its function to a special purpose; a special purpose computer; ASIC; or other programmable digital data processing apparatus, such that the instructions, which execute via the processor of the computer or other programmable data processing apparatus, implement the functions/acts specified in the block diagrams or operational block or blocks, thereby transforming their functionality in accordance with embodiments herein.

For the purposes of this disclosure a computer readable medium (or computer-readable storage medium/media) stores computer data, which data can include computer program code (or computer-executable instructions) that is executable by a computer, in machine readable form. By way of example, and not limitation, a computer readable medium may comprise computer readable storage media, for tangible or fixed storage of data, or communication media for transient interpretation of code-containing signals. Computer readable storage media, as used herein, refers to physical or tangible storage (as opposed to signals) and includes without limitation volatile and non-volatile, removable and non-removable media implemented in any method or technology for the tangible storage of information such as computer-readable instructions, data structures, program modules or other data. Computer readable storage media includes, but is not limited to, RAM, ROM, EPROM, EEPROM, flash memory or other solid state memory technology, CD-ROM, DVD, or other optical storage, magnetic cassettes, magnetic tape, magnetic disk storage or other magnetic storage devices, or any other physical or material medium which can be used to tangibly store the desired information or data or instructions and which can be accessed by a computer or processor.

For the purposes of this disclosure the term "server" should be understood to refer to a service point which provides processing, database, and communication facilities. By way of example, and not limitation, the term "server" can refer to a single, physical processor with associated communications and data storage and database facilities, or it can refer to a networked or clustered complex of processors and associated network and storage devices, as well as operating software and one or more database systems and application software that support the services provided by the server. Servers may vary widely in configuration or capabilities, but generally a server may include one or more central processing units and memory. A server may also include one or more mass storage devices, one or more power supplies, one or more wired or wireless network interfaces, one or more input/output interfaces, or one or more operating systems, such as Windows Server, Mac OS X, Unix, Linux, FreeBSD, or the like.

For the purposes of this disclosure a "network" should be understood to refer to a network that may couple devices so that communications may be exchanged, such as between a server and a client device or other types of devices, including between wireless devices coupled via a wireless network, for example. A network may also include mass storage, such as network attached storage (NAS), a storage area network (SAN), or other forms of computer or machine readable media, for example. A network may include the Internet, one or more local area networks (LANs), one or more wide area networks (WANs), wire-line type connections, wireless type connections, cellular or any combination thereof. Likewise, sub-networks, which may employ differing architectures or may be compliant or compatible with differing protocols, may interoperate within a larger network. Various types of devices may, for example, be made available to provide an interoperable capability for differing architectures or protocols. As one illustrative example, a router may provide a link between otherwise separate and independent LANs.

A communication link or channel may include, for example, analog telephone lines, such as a twisted wire pair, a coaxial cable, full or fractional digital lines including T1, T2, T3, or T4 type lines, Integrated Services Digital Networks (ISDNs), Digital Subscriber Lines (DSLs), wireless links including satellite links, or other communication links or channels, such as may be known to those skilled in the art. Furthermore, a computing device or other related electronic devices may be remotely coupled to a network, such as via a wired or wireless line or link, for example.

For purposes of this disclosure, a "wireless network" should be understood to couple client devices with a network. A wireless network may employ stand-alone ad-hoc networks, mesh networks, Wireless LAN (WLAN) networks, cellular networks, or the like. A wireless network may further include a system of terminals, gateways, routers, or the like coupled by wireless radio links, or the like, which may move freely, randomly or organize themselves arbitrarily, such that network topology may change, at times even rapidly.

A wireless network may further employ a plurality of network access technologies, including Wi-Fi, Long Term Evolution (LTE), WLAN, Wireless Router (WR) mesh, or 2nd, 3rd, or 4th generation (2G, 3G, or 4G) cellular technology, or the like. Network access technologies may enable wide area coverage for devices, such as client devices with varying degrees of mobility, for example.

For example, a network may enable RF or wireless type communication via one or more network access technologies, such as Global System for Mobile communication (GSM), Universal Mobile Telecommunications System (UMTS), General Packet Radio Services (GPRS), Enhanced Data GSM Environment (EDGE), 3GPP Long Term Evolution (LTE), LTE Advanced, Wideband Code Division Multiple Access (WCDMA), Bluetooth, 802.11b/g/n, or the like. A wireless network may include virtually any type of wireless communication mechanism by which signals may be communicated between devices, such as a client device or a computing device, between or within a network, or the like.

A computing device may be capable of sending or receiving signals, such as via a wired or wireless network, or may be capable of processing or storing signals, such as in memory as physical memory states, and may, therefore, operate as a server. Thus, devices capable of operating as a server may include, as examples, dedicated rack-mounted servers, desktop computers, laptop computers, set top boxes, integrated devices combining various features, such as two or more features of the foregoing devices, or the like. Servers may vary widely in configuration or capabilities, but generally a server may include one or more central processing units and memory. A server may also include one or more mass storage devices, one or more power supplies, one or more wired or wireless network interfaces, one or more input/output interfaces, or one or more operating systems, such as Windows Server, Mac OS X, Unix, Linux, FreeBSD, or the like.

For purposes of this disclosure, a client (or consumer or user) device may include a computing device capable of sending or receiving signals, such as via a wired or a wireless network. A client device may, for example, include a desktop computer or a portable device, such as a cellular telephone, a smart phone, a display pager, a radio frequency (RF) device, an infrared (IR) device an Near Field Communication (NFC) device, a Personal Digital Assistant (PDA), a handheld computer, a tablet computer, a phablet, a laptop computer, a set top box, a wearable computer, smart watch, an integrated or distributed device combining various features, such as features of the forgoing devices, or the like.

A client device may vary in terms of capabilities or features. Claimed subject matter is intended to cover a wide range of potential variations. For example, a simple smart phone, phablet or tablet may include a numeric keypad or a display of limited functionality, such as a monochrome liquid crystal display (LCD) for displaying text. In contrast, however, as another example, a web-enabled client device may include a high resolution screen, one or more physical or virtual keyboards, mass storage, one or more accelerometers, one or more gyroscopes, global positioning system (GPS) or other location-identifying type capability, or a display with a high degree of functionality, such as a touch-sensitive color 2D or 3D display, for example.

A client device may include or may execute a variety of operating systems, including a personal computer operating system, such as a Windows, iOS or Linux, or a mobile operating system, such as iOS, Android, or Windows Mobile, or the like.

A client device may include or may execute a variety of possible applications, such as a client software application enabling communication with other devices, such as communicating one or more messages, such as via email, for example Yahoo!® Mail, short message service (SMS), or multimedia message service (MMS), for example Yahoo! Messenger®, including via a network, such as a social network, of, for example, Tumblr®, Facebook®, LinkedIn®, Twitter®, Flickr®, or Google+®, Instagram™ social networking services, to provide only a few possible examples. A client device may also include or execute an application to communicate content, such as, for example, textual content, multimedia content, or the like. A client device may also include or execute an application to perform a variety of possible tasks, such as browsing, searching, playing or displaying various forms of content, including locally stored or streamed video, or games (such as fantasy sports leagues). The foregoing is provided to illustrate that claimed subject matter is intended to include a wide range of possible features or capabilities.

The detailed description provided herein is not intended as an extensive or detailed discussion of known concepts, and as such, details that are known generally to those of ordinary skill in the relevant art may have been omitted or may be handled in summary fashion.

The principles described herein may be embodied in many different forms. By way of background, an electronic message is a message that is transmitted between a sender and a recipient(s) via an electronic messaging service. Examples of an electronic message include an electronic mail message, an instant message, a short message, a multimedia message, and the like. Examples of an electronic message service include an electronic mail service, a short message service (SMS), a multimedia message service (MMS), and the like. Examples of services to which an automated connection is formed, include Facebook®, LinkedIn®, Quora®, Netflix® or the like.

An electronic message is typically directed to a user via an electronic messaging service using the user's account with the electronic messaging service. The electronic message received by a user of the electronic messaging service via the electronic messaging service can include a universal resource locator (URL), or other reference or link, to another service external to the electronic messaging service, such as a social networking service (e.g., Facebook®). The electronic message, e.g., an electronic mail message, might be sent by the service itself as an alert, or notification, to a user. For example, a social networking service might transmit an electronic message to a user of the social networking service alerting the user to an event that occurred in connection with the social networking service. The electronic message typically includes a URL that when selected directs the user to the social networking service so that the user can take an action with the social networking service. As another example, in addition to an electronic message originating from the social networking service itself, the electronic message that is directed to the user via the electronic messaging service may be from another source, e.g., an online merchant. In any case, the electronic message that is directed to the user via the electronic messaging service can include a URL, or other reference, that when selected directs the user to the social networking service.

As one non-limiting example, the electronic message can be an electronic mail message that is sent to the email address (account) that the user has with the electronic messaging service. The email address can be supplied to the social networking service, or other service, by the user as part of the user's registration with the social networking service (or other service) or some other time. By way of some non-limiting examples, the email might notify the user that the user is invited to an event and prompt the user to RSVP to the invitation, prompt the user to view shared content and/or to share content with other users of the social networking service, prompt the user to like an object (e.g., a post, tag, or the like) in the social networking service, prompt the user to make a comment, prompt the user to provide feedback or other information (e.g., a question and/or answer in connection with a question and answer service), etc.

The electronic message sent to the user's electronic mail address can be accessed by the user using the electronic mail service's client application or using a web site of a provider of the electronic messaging service. The electronic message typically includes a URL, or other reference or link, that is selectable by the user and (if selected) directs the user to the social networking service (or other service), e.g., a web page or client application of the social networking service (or other service). User selection of the link typically results in a web page of the social networking service (other service) being opened in a browser application executing on the client computing device of the user, or a client application of the social networking service (or other service) being opened on the client computing device. In either case, the display of the client computing device of the user changes from displaying the web page (or client application user interface) of the electronic messaging service to displaying a user interface of the social networking service (or other service).

Selection of the URL effectively turns the attention of the user away from the electronic messaging service and to the other service. This reduces user engagement with the electronic mail service, decreases marketing potential for the electronic mail service provider, and negatively impacts customer relations of the electronic message service provider with new and existing customers. In addition, the existing paradigm expends networking resources, server computing device resources and client computing device resources needed to display the other service's user interface at the client computing device.

As such, the instant disclosure provides a novel solution addressing the immediate demand for an automated system, application and/or platform that automatically links electronic messaging service with another service. The present disclosure provides novel systems and methods for automatically linking an electronic messaging service with another service and transmitting a request for an action to be taken on behalf of a user of the electronic messaging service and the other service in response to the user's selection, in an electronic message of the electronic messaging service, of a URL identifying the other service and the action.

According to some embodiments, the disclosed systems and methods first receives an electronic message addressed to a user of the electronic messaging service, the received message includes a user-selectable prompt with an associated link to direct the user to a social networking service. Input from the user selecting the associated link directed to the social networking service is intercepted by a connection service which automatically makes a connection to the social networking service to perform a number of actions indicated by the user-selectable prompt. The connection service obtains and stores an authorization to access the user's social networking service data on the user's behalf, accesses the social networking service data, (e.g., reads, updates, or adds data) on the user's behalf using the obtained authorization to request each action of the number of actions indicated by the user-selectable prompt, receives a response from the social networking service indicating the status of the requested action and provides feedback to the user within a user interface of the electronic messaging service.

The benefits of the disclosed systems and methods can be evidenced multi-fold: 1) the disclosed systems and methods provide a technologically based mechanism for automating a connection between an electronic messaging service and another service for purposes of performing an action on behalf of a user of the electronic messaging service and the other service in response to the user's selection, in an electronic message of the electronic messaging service, of a URL identifying the other service and the action; (2) the proposed systems and methods promote user engagement and satisfaction with the electronic messaging service and the other service by facilitating the user's interaction with both the electronic messaging service and the other service; (3) the proposed systems and methods make improvements to existing technologies, including electronic messaging and social networking technologies, and reduce the expenditure of network resources, client computing resources and server computing resources.

The disclosed systems and methods can be implemented for any type of electronic message, including electronic mail message, an instant message, a short message, a multimedia message, and the like; any electronic messaging service, including an electronic mail messaging service, short message service, multimedia message service, or the like; and any second (or other) service external to the electronic messaging service, including a social networking service, an online merchant service, question and answer service, and the like. While the discussion herein will focus on an electronic mail (email) message, an electronic mail (email) messaging service and a social networking service, it should not be construed as limiting, as any type of electronic message, electronic messaging service, and external service, whether known or to be known, can be utilized without departing from the scope of the instant disclosure.

Figure 1:
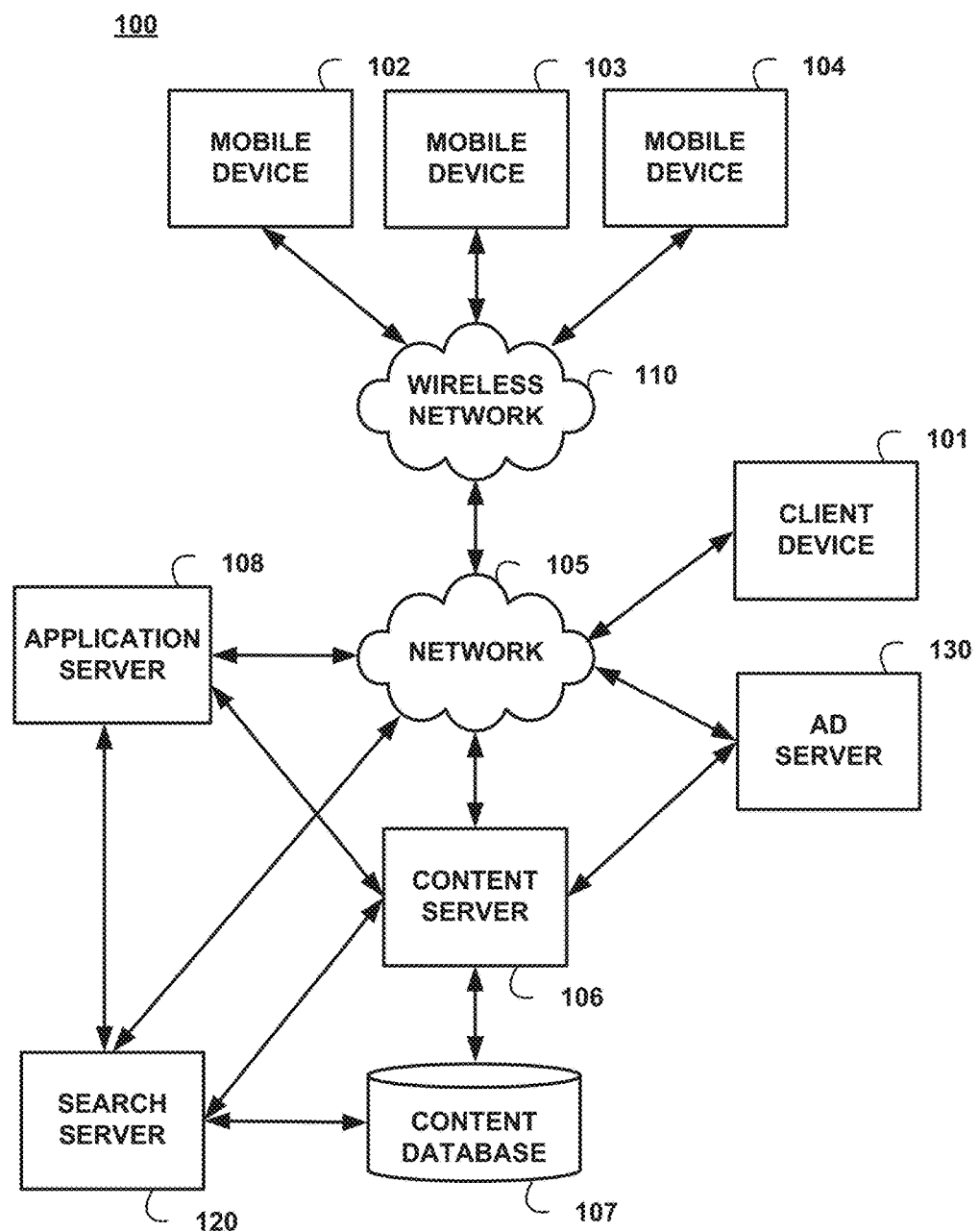
FIG. 1 is a schematic diagram illustrating an example of a network within which the systems and methods disclosed herein could be implemented according to some embodiments of the present disclosure.

Certain embodiments will now be described in greater detail with reference to the figures. In general, with reference to FIG. 1, a system 100 in accordance with an embodiment of the present disclosure is shown. FIG. 1 shows components of a general environment in which the systems and methods discussed herein may be practiced. Not all the components may be required to practice the disclosure, and variations in the arrangement and type of the components may be made without departing from the spirit or scope of the disclosure. As shown, system 100 of FIG. 1 includes local area networks ("LANs")/wide area networks ("WANs")—network 105, wireless network 110, mobile devices (client devices) 102-104 and client device 101. FIG. 1 additionally includes a variety of servers, such as content server 106, application (or "App") server 108, search server 120 and advertising ("ad") server 130.

One embodiment of mobile devices 102-104 is described in more detail below. Generally, however, mobile devices 102-104 may include virtually any portable computing device capable of receiving and sending a message over a network, such as network 105, wireless network 110, or the like. Mobile devices 102-104 may also be described generally as client devices that are configured to be portable. Thus, mobile devices 102-104 may include virtually any portable computing device capable of connecting to another computing device and receiving information. Such devices include multi-touch and portable devices such as, cellular telephones, smart phones, display pagers, radio frequency (RF) devices, infrared (IR) devices, Personal Digital Assistants (PDAs), handheld computers, laptop computers, wearable computers, smart watch, tablet computers, phablets, integrated devices combining one or more of the preceding devices, and the like. As such, mobile devices 102-104 typically range widely in terms of capabilities and features. For example, a cell phone may have a numeric keypad and a few lines of monochrome LCD display on which only text may be displayed. In another example, a web-enabled mobile device may have a touch sensitive screen, a stylus, and an HD display in which both text and graphics may be displayed.

A web-enabled mobile device may include a browser application that is configured to receive and to send web pages, web-based messages, and the like. The browser application may be configured to receive and display graphics, text, multimedia, and the like, employing virtually any web based language, including a wireless application protocol messages (WAP), and the like. In one embodiment, the browser application is enabled to employ Handheld Device Markup Language (HDML), Wireless Markup Language (WML), WMLScript, JavaScript, Standard Generalized Markup Language (SMGL), HyperText Markup Language (HTML), eXtensible Markup Language (XML), and the like, to display and send a message.

Mobile devices 102-104 also may include at least one client application that is configured to receive content from another computing device. The client application may include a capability to provide and receive textual content, graphical content, audio content, and the like. The client application may further provide information that identifies itself, including a type, capability, name, and the like. In one embodiment, mobile devices 102-104 may uniquely identify themselves through any of a variety of mechanisms, including a phone number, Mobile Identification Number (MIN), an electronic serial number (ESN), or other mobile device identifier.

In some embodiments, mobile devices 102-104 may also communicate with non-mobile client devices, such as client device 101, or the like. In one embodiment, such communications may include sending and/or receiving messages, searching for, viewing and/or sharing photographs, audio clips, video clips, or any of a variety of other forms of communications. Client device 101 may include virtually any computing device capable of communicating over a network to send and receive information. The set of such devices may include devices that typically connect using a wired or wireless communications medium such as personal computers, multiprocessor systems, microprocessor-based or programmable consumer electronics, network PCs, or the like. Thus, client device 101 may also have differing capabilities for displaying navigable views of information.

Client devices 101-104 computing device may be capable of sending or receiving signals, such as via a wired or wireless network, or may be capable of processing or storing signals, such as in memory as physical memory states, and may, therefore, operate as a server. Thus, devices capable of operating as a server may include, as examples, dedicated rack-mounted servers, desktop computers, laptop computers, set top boxes, integrated devices combining various features, such as two or more features of the foregoing devices, or the like.

Wireless network 110 is configured to couple mobile devices 102-104 and its components with network 105. Wireless network 110 may include any of a variety of wireless sub-networks that may further overlay stand-alone ad-hoc networks, and the like, to provide an infrastructure-oriented connection for mobile devices 102-104. Such sub-networks may include mesh networks, Wireless LAN (WLAN) networks, cellular networks, and the like.

Network 105 is configured to couple content server 106, application server 108, or the like, with other computing devices, including, client device 101, and through wireless network 110 to mobile devices 102-104. Network 105 is enabled to employ any form of computer readable media for communicating information from one electronic device to another. Also, network 105 can include the Internet in addition to local area networks (LANs), wide area networks (WANs), direct connections, such as through a universal serial bus (USB) port, other forms of computer-readable media, or any combination thereof. On an interconnected set of LANs, including those based on differing architectures and protocols, a router acts as a link between LANs, enabling messages to be sent from one to another, and/or other computing devices.

Within the communications networks utilized or understood to be applicable to the present disclosure, such networks will employ various protocols that are used for communication over the network. Signal packets communicated via a network, such as a network of participating digital communication networks, may be compatible with or compliant with one or more protocols. Signaling formats or protocols employed may include, for example, TCP/IP, UDP, QUIC (Quick UDP Internet Connection), DECnet, NetBEUI, IPX, APPLETALK™, or the like. Versions of the Internet Protocol (IP) may include IPv4 or IPv6. The Internet refers to a decentralized global network of networks. The Internet includes local area networks (LANs), wide area networks (WANs), wireless networks, or long haul public networks that, for example, allow signal packets to be communicated between LANs. Signal packets may be communicated between nodes of a network, such as, for example, to one or more sites employing a local network address. A signal packet may, for example, be communicated over the Internet from a user site via an access node coupled to the Internet. Likewise, a signal packet may be forwarded via network nodes to a target site coupled to the network via a network access node, for example. A signal packet communicated via the Internet may, for example, be routed via a path of gateways, servers, etc. that may route the signal packet in accordance with a target address and availability of a network path to the target address.

According to some embodiments, the present disclosure may also be utilized within or accessible to an electronic social networking site in connection with a social networking service. A social network refers generally to an electronic network of individuals, such as acquaintances, friends, family, colleagues, or co-workers, which are coupled via a communications network or via a variety of sub-networks. Potentially, additional relationships may subsequently be formed as a result of social interaction via the communications network or sub-networks. In some embodiments, multi-modal communications may occur between members of the social network. Individuals within one or more social networks may interact or communication with other members of a social network via a variety of devices. Multi-modal communication technologies refer to a set of technologies that permit interoperable communication across multiple devices or platforms, such as cell phones, smart phones, tablet computing devices, phablets, personal computers, televisions, set-top boxes, SMS/MMS, email, instant messenger clients, forums, social networking sites, or the like.

In some embodiments, the disclosed networks 110 and/or 105 may comprise a content distribution network(s). A "content delivery network" or "content distribution network" (CDN) generally refers to a distributed content delivery system that comprises a collection of computers or computing devices linked by a network or networks. A CDN may employ software, systems, protocols or techniques to facilitate various services, such as storage, caching, communication of content, or streaming media or applications. A CDN may also enable an entity to operate or manage another's site infrastructure, in whole or in part.

The content server 106 may include a device that includes a configuration to provide content via a network to another device. A content server 106 may, for example, host a site or service, such as streaming media site/service (e.g., YouTube®), an email platform or social networking site, or a personal user site (such as a blog, vlog, online dating site, and the like). A content server 106 may also host a variety of other sites, including, but not limited to business sites, educational sites, dictionary sites, encyclopedia sites, wikis, financial sites, government sites, and the like. Devices that may operate as content server 106 include personal computers desktop computers, multiprocessor systems, microprocessor-based or programmable consumer electronics, network PCs, servers, and the like.

Content server 106 can further provide a variety of services that include, but are not limited to, streaming and/or downloading media services, search services, email services, photo services, web services, social networking services, news services, third-party services, audio services, video services, instant messaging (IM) services, SMS services, MMS services, FTP services, voice over IP (VOIP)

services, or the like. Such services, for example a video application and/or video platform, can be provided via the application server 108, whereby a user is able to utilize such service upon the user being authenticated, verified or identified by the service. Examples of content may include images, text, audio, video, or the like, which may be processed in the form of physical signals, such as electrical signals, for example, or may be stored in memory, as physical states, for example.

An ad server 130 comprises a server that stores online advertisements for presentation to users. "Ad serving" refers to methods used to place online advertisements on websites, in applications, or other places where users are more likely to see them, such as during an online session or during computing platform use, for example. Various monetization techniques or models may be used in connection with sponsored advertising, including advertising associated with user. Such sponsored advertising includes monetization techniques including sponsored search advertising, non-sponsored search advertising, guaranteed and non-guaranteed delivery advertising, ad networks/exchanges, ad targeting, ad serving and ad analytics. Such systems can incorporate near instantaneous auctions of ad placement opportunities during web page creation, (in some cases in less than 500 milliseconds) with higher quality ad placement opportunities resulting in higher revenues per ad. That is advertisers will pay higher advertising rates when they believe their ads are being placed in or along with highly relevant content that is being presented to users. Reductions in the time needed to quantify a high quality ad placement offers ad platforms competitive advantages. Thus higher speeds and more relevant context detection improve these technological fields.

For example, a process of buying or selling online advertisements may involve a number of different entities, including advertisers, publishers, agencies, networks, or developers. To simplify this process, organization systems called "ad exchanges" may associate advertisers or publishers, such as via a platform to facilitate buying or selling of online advertisement inventory from multiple ad networks. "Ad networks" refers to aggregation of ad space supply from publishers, such as for provision en masse to advertisers. For web portals like Yahoo! ®, advertisements may be displayed on web pages or in apps resulting from a user-defined search based at least in part upon one or more search terms. Advertising may be beneficial to users, advertisers or web portals if displayed advertisements are relevant to interests of one or more users. Thus, a variety of techniques have been developed to infer user interest, user intent or to subsequently target relevant advertising to users. One approach to presenting targeted advertisements includes employing demographic characteristics (e.g., age, income, sex, occupation, etc.) for predicting user behavior, such as by group. Advertisements may be presented to users in a targeted audience based at least in part upon predicted user behavior(s).

Another approach includes profile-type ad targeting. In this approach, user profiles specific to a user may be generated to model user behavior, for example, by tracking a user's path through a web site or network of sites, and compiling a profile based at least in part on pages or advertisements ultimately delivered. A correlation may be identified, such as for user purchases, for example. An identified correlation may be used to target potential purchasers by targeting content or advertisements to particular users. During presentation of advertisements, a presentation system may collect descriptive content about types of advertisements presented to users. A broad range of descriptive content may be gathered, including content specific to an advertising presentation system. Advertising analytics gathered may be transmitted to locations remote to an advertising presentation system for storage or for further evaluation. Where advertising analytics transmittal is not immediately available, gathered advertising analytics may be stored by an advertising presentation system until transmittal of those advertising analytics becomes available.

Servers 106, 108, 120 and 130 may be capable of sending or receiving signals, such as via a wired or wireless network, or may be capable of processing or storing signals, such as in memory as physical memory states. Devices capable of operating as a server may include, as examples, dedicated rack-mounted servers, desktop computers, laptop computers, set top boxes, integrated devices combining various features, such as two or more features of the foregoing devices, or the like. Servers may vary widely in configuration or capabilities, but generally, a server may include one or more central processing units and memory. A server may also include one or more mass storage devices, one or more power supplies, one or more wired or wireless network interfaces, one or more input/output interfaces, or one or more operating systems, such as Windows Server, Mac OS X, Unix, Linux, FreeBSD, or the like.

In some embodiments, users are able to access services provided by servers 106, 108, 120 and/or 130. This may include in a non-limiting example, authentication servers, search servers, email servers, social networking services servers, SMS servers, IM servers, MMS servers, exchange servers, photo-sharing services servers, and travel services servers, via the network 105 using their various devices 101-104. In some embodiments, applications, such as a streaming video application (e.g., YouTube®, Netflix®, Hulu®, iTunes®, Amazon Prime®, HBO Go®, and the like), blog, photo storage/sharing application or social networking application (e.g., Flickr®, Tumblr®, and the like), can be hosted by the application server 108 (or content server 106, search server 120 and the like). Thus, the application server 108 can store various types of applications and application related information including application data and user profile information (e.g., identifying and behavioral information associated with a user). It should also be understood that content server 106 can also store various types of data related to the content and services provided by content server 106 in an associated content database 107, as discussed in more detail below. Embodiments exist where the network 105 is also coupled with/connected to a Trusted Search Server (TSS) which can be utilized to render content in accordance with the embodiments discussed herein. Embodiments exist where the TSS functionality can be embodied within servers 106, 108, 120 and/or 130.

Moreover, although FIG. 1 illustrates servers 106, 108, 120 and 130 as single computing devices, respectively, the disclosure is not so limited. For example, one or more functions of servers 106, 108, 120 and/or 130 may be distributed across one or more distinct computing devices. Moreover, in one embodiment, servers 106, 108, 120 and/or 130 may be integrated into a single computing device, without departing from the scope of the present disclosure.

Figure 2:
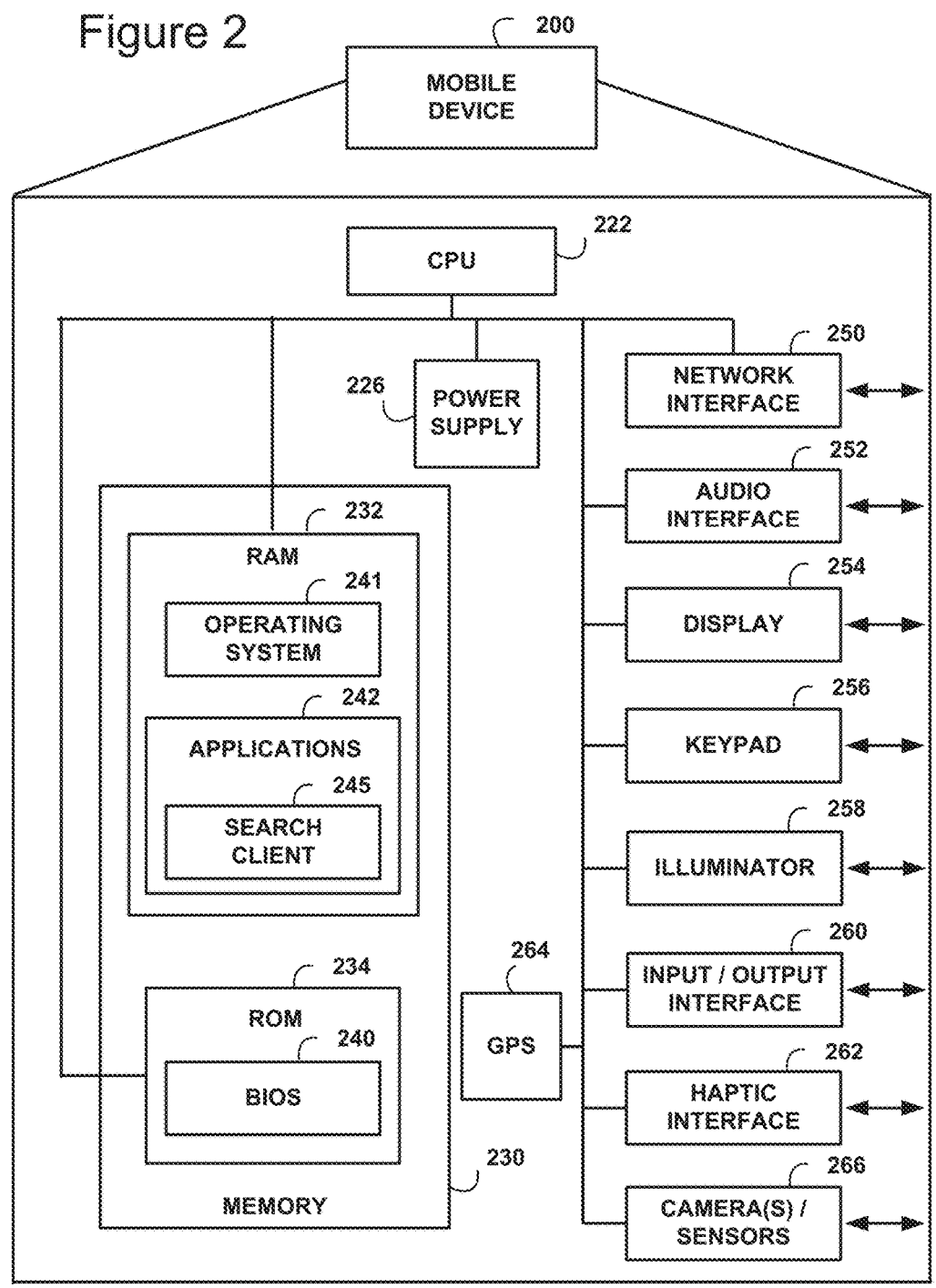
FIG. 2 depicts is a schematic diagram illustrating an example of client device in accordance with some embodiments of the present disclosure.

FIG. 2 is a schematic diagram illustrating a client device showing an example embodiment of a client device that may be used within the present disclosure. Client device 200 may include many more or less components than those shown in FIG. 2. However, the components shown are sufficient to disclose an illustrative embodiment for implementing the present disclosure. Client device 200 may represent, for example, client devices discussed above in relation to FIG. 1.

As shown in the figure, client device 200 includes a processing unit (CPU) 222 in communication with a mass memory 230 via a bus 224. Client device 200 also includes a power supply 226, one or more network interfaces 250, an audio interface 252, a display 254, a keypad 256, an illuminator 258, an input/output interface 260, a haptic interface 262, an optional global positioning systems (GPS) receiver 264 and a camera(s) or other optical, thermal or electromagnetic sensors 266. Device 200 can include one camera/sensor 266, or a plurality of cameras/sensors 266, as understood by those of skill in the art. The positioning of the camera(s)/sensor(s) 266 on device 200 can change per device 200 model, per device 200 capabilities, and the like, or some combination thereof.

Power supply 226 provides power to client device 200. A rechargeable or non-rechargeable battery may be used to provide power. The power may also be provided by an external power source, such as an AC adapter or a powered docking cradle that supplements and/or recharges a battery.

Client device 200 may optionally communicate with a base station (not shown), or directly with another computing device. Network interface 250 includes circuitry for coupling Client device 200 to one or more networks, and is constructed for use with one or more communication protocols and technologies as discussed above. Network interface 250 is sometimes known as a transceiver, transceiving device, or network interface card (NIC).

Audio interface 252 is arranged to produce and receive audio signals such as the sound of a human voice. For example, audio interface 252 may be coupled to a speaker and microphone (not shown) to enable telecommunication with others and/or generate an audio acknowledgement for some action. Display 254 may be a liquid crystal display (LCD), gas plasma, light emitting diode (LED), or any other type of display used with a computing device. Display 254 may also include a touch sensitive screen arranged to receive input from an object such as a stylus or a digit from a human hand.

Keypad 256 may comprise any input device arranged to receive input from a user. For example, keypad 256 may include a push button numeric dial, or a keyboard. Keypad 256 may also include command buttons that are associated with selecting and sending images. Illuminator 258 may provide a status indication and/or provide light. Illuminator 258 may remain active for specific periods of time or in response to events. For example, when illuminator 258 is active, it may backlight the buttons on keypad 256 and stay on while the client device is powered. Also, illuminator 258 may backlight these buttons in various patterns when particular actions are performed, such as dialing another client device. Illuminator 258 may also cause light sources positioned within a transparent or translucent case of the client device to illuminate in response to actions.

Client device 200 also comprises input/output interface 260 for communicating with external devices, such as a headset, or other input or output devices not shown in FIG. 2. Input/output interface 260 can utilize one or more communication technologies, such as USB, infrared, Bluetooth™, or the like. Haptic interface 262 is arranged to provide tactile feedback to a user of the client device. For example, the haptic interface may be employed to vibrate client device 200 in a particular way when the client device 200 receives a communication from another user.

Optional GPS transceiver 264 can determine the physical coordinates of client device 200 on the surface of the Earth, which typically outputs a location as latitude and longitude values. GPS transceiver 264 can also employ other geo-positioning mechanisms, including, but not limited to, triangulation, assisted GPS (AGPS), E-OTD, CI, SAI, ETA, BSS or the like, to further determine the physical location of client device 200 on the surface of the Earth. It is understood that under different conditions, GPS transceiver 264 can determine a physical location within millimeters for client device 200; and in other cases, the determined physical location may be less precise, such as within a meter or significantly greater distances. In one embodiment, however, client device 200 may through other components, provide other information that may be employed to determine a physical location of the device, including for example, a MAC address, Internet Protocol (IP) address, or the like.

Mass memory 230 includes a RAM 232, a ROM 234, and other storage means. Mass memory 230 illustrates another example of computer storage media for storage of information such as computer readable instructions, data structures, program modules or other data. Mass memory 230 stores a basic input/output system ("BIOS") 240 for controlling low-level operation of client device 200. The mass memory also stores an operating system 241 for controlling the operation of client device 200. It will be appreciated that this component may include a general purpose operating system such as a version of UNIX, or LINUX™, or a specialized client communication operating system such as Windows Client™, or the Symbian® operating system. The operating system may include, or interface with a Java virtual machine module that enables control of hardware components and/or operating system operations via Java application programs.

Memory 230 further includes one or more data stores, which can be utilized by client device 200 to store, among other things, applications 242 and/or other data. For example, data stores may be employed to store information that describes various capabilities of client device 200. The information may then be provided to another device based on any of a variety of events, including being sent as part of a header during a communication, sent upon request, or the like. At least a portion of the capability information may also be stored on a disk drive or other storage medium (not shown) within client device 200.

Applications 242 may include computer executable instructions which, when executed by client device 200, transmit, receive, and/or otherwise process audio, video, images, and enable telecommunication with a server and/or another user of another client device. Other examples of application programs or "apps" in some embodiments include browsers, calendars, contact managers, task managers, transcoders, photo management, database programs, word processing programs, security applications, spreadsheet programs, games, search programs, and so forth. Applications 242 may further include search client 245 that is configured to send, to receive, and/or to otherwise process a search query and/or search result using any known or to be known communication protocols. Although a single search client 245 is illustrated it should be clear that multiple search clients may be employed. For example, one search client may be configured to enter a search query message, where another search client manages search results, and yet another search client is configured to manage serving advertisements, IMs, emails, and other types of known messages, or the like.

Having described the components of the general architecture employed within the disclosed systems and methods, the components' general operation with respect to the disclosed systems and method will now be described below.

Figure 3:
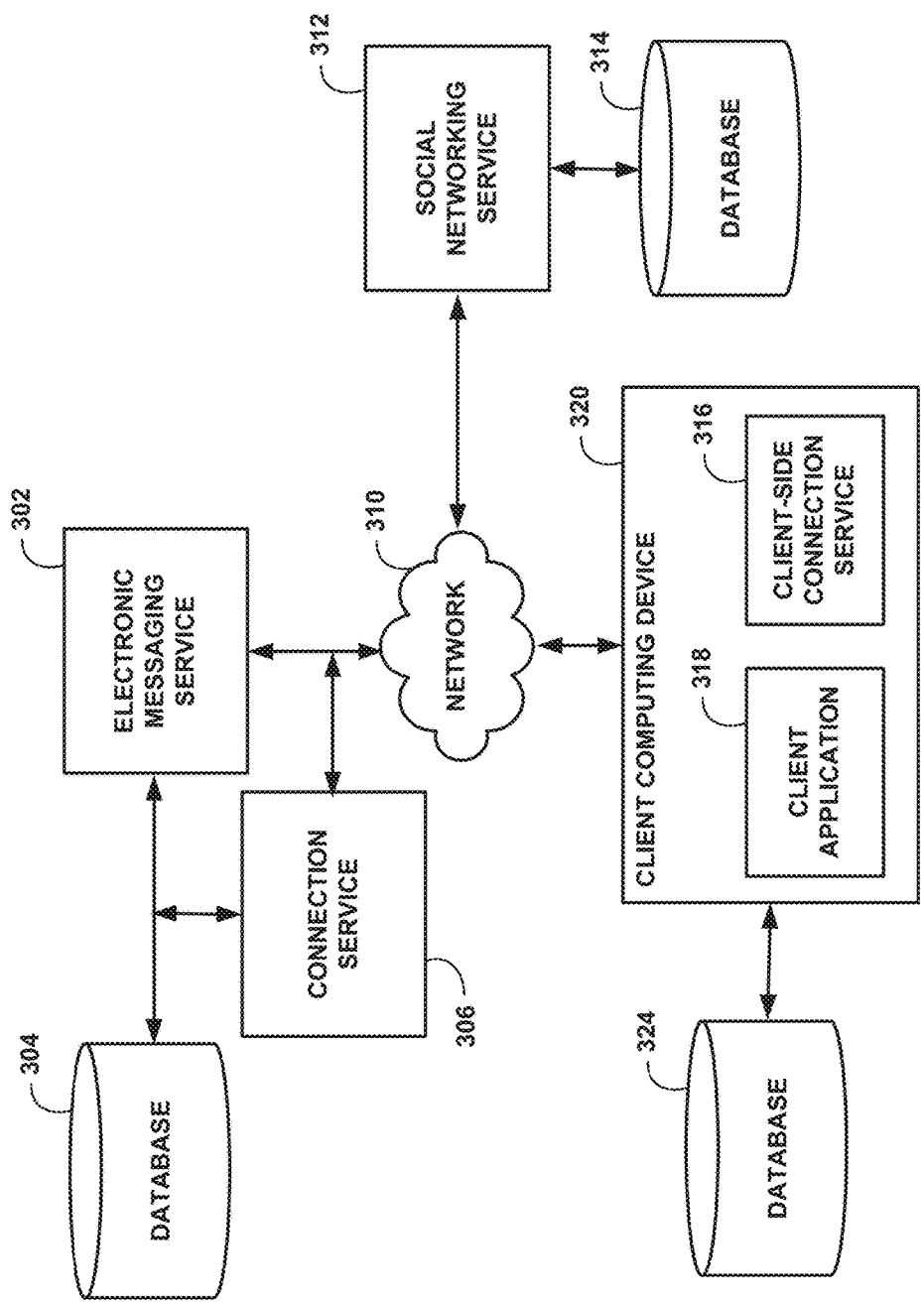
FIG. 3 is a block diagram illustrating the components for performing the systems and methods in accordance with some embodiments of the present disclosure.

FIG. 3 is a block diagram illustrating the components for performing the systems and methods discussed herein. FIG. 3 includes an electronic messaging service 302, network 310, a social networking service 312 (as a second service other than the electronic messaging service), and client computing device 320. By way of some non-limiting examples, the electronic messaging service 302 and connection service 306 can be hosted by one or more servers of an email service provider and the social networking service can be hosted by one or more servers of a social networking service provider. In some embodiments, the electronic messaging service 302, connection service 306 and social networking service 312 can each be a web-based application accessible by the client computing device 320 over the network 310. The client computing device 320 can be mobile device 102 or client device 101, for example.

By way of a further exemplary explanation, the connection service 306 and a client-side connection service 316 can be installed as a script, program or application augmenting another application. The connection service 306 is shown as being external to the electronic messaging service 302; however, the connection service 306 can be an internal script, program or application of the electronic messaging service. Similarly, connection service 316 can be an internal script, program or application of client application 318. Client application 318 can comprise one or more client applications. Some examples of client application 318 comprise a browser application, an email client application, a text messaging client application, a social networking client application, and the like.

Databases 304, 314 and 324 can be any type of database or memory. Databases 304, 314 and 324 comprise a dataset of data and metadata associated with local and/or network information related to users, services, applications, content (e.g., video) and the like. Such information can be stored and indexed in the databases 304, 314 and 324 independently and/or as a linked or associated dataset. It should be understood that the data (and metadata) in the databases 304, 314 and 324 can be any type of information and type, whether known or to be known, without departing from the scope of the present disclosure.

According to some embodiments, databases 304, 314 and 324 can store data for users, e.g., user data. According to some embodiments, the stored user data can include, but is not limited to, information associated with a user's profile, user authentication (e.g., user identification and validation information such as login name and password, a short-lived access token, a long-lived access token, authentication code, etc.), user interests, user behavioral information, user attributes, user preferences or settings, user demographic information, user location information, user biographic information, and the like, or some combination thereof.

In some embodiments, the user data can also include, for purposes of forming an automated connection with social networking service 312 and performing one or more actions, including, but not limited to, device identifying information, device capability information, voice/data carrier information, Internet Protocol (IP) address, applications installed or capable of being installed or executed on such device, and/or any, or some combination thereof. It should be understood that the data (and metadata) in the database 304, 314 and 324 can be any type of information related to a user, content, a device, an application, a service provider, a content provider, whether known or to be known, without departing from the scope of the present disclosure.

The network 310 can be any type of network such as, but not limited to, a wireless network, a local area network (LAN), wide area network (WAN), the Internet, or a combination thereof. The network 310 facilitates connectivity of the electronic messaging service 302, client computing device 320, social networking service 312, connection services 306 and 316 and client application 318.

The principal processor, server, or combination of devices that comprises hardware programmed in accordance with the special purpose functions herein is referred to for convenience as a service, e.g., connection service 306 and client-side connection service 316. It should be understood that the modules discussed herein are non-exhaustive, as additional or fewer modules (or sub-modules) may be applicable to the embodiments of the systems and methods discussed. The operations, configurations and functionalities of each module, and their role within embodiments of the present disclosure will be discussed with reference to FIG. 4.

Figure 4:
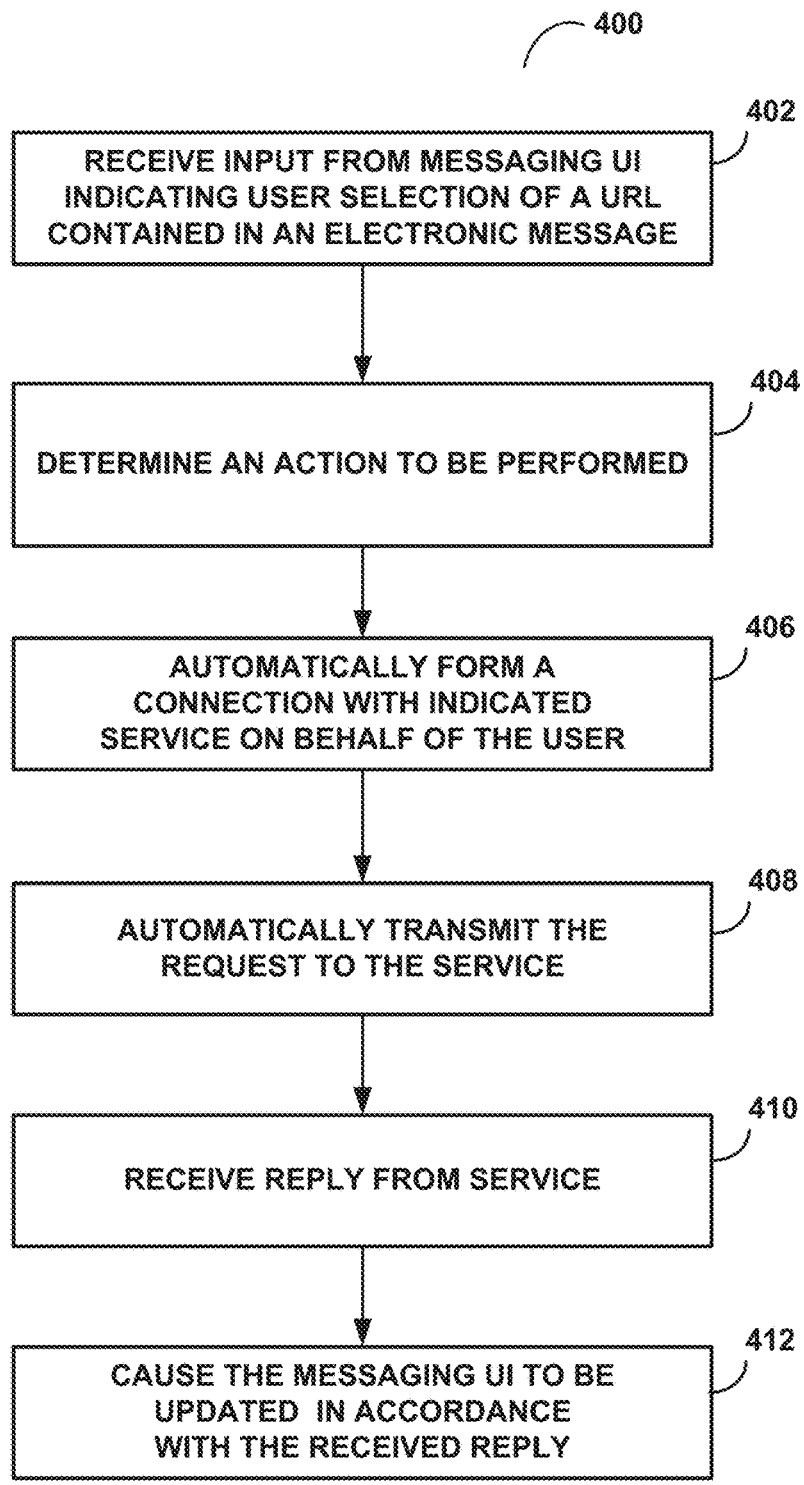
FIG. 4 is a flowchart illustrating steps performed in accordance with some embodiments of the present disclosure.

FIG. 4 provides a process flow overview in accordance with one or more embodiments of the present disclosure. Process 400 of FIG. 4 details steps performed in accordance with exemplary embodiments of the present disclosure for forming a connection with a second service, such as social networking service 312, to initiate an action in response to input indicative of a selection by a user of a URL within an electronic message directed to the user via the electronic messaging service 302. According to some embodiments, as discussed herein with relation to FIG. 4, the process involves receiving input indicative of the selection by the user of the URL contained in the electronic message. In response to receiving such input, the process determines an action that is to be performed with the social networking service, automatically forms a connection with the social networking service 312, causes the action to be performed by the social networking service 312, and updates the user interface of the electronic messaging service 302 with information indicating a status of the operation undertaken, on behalf of the user, to perform the action, as discussed in more detail below.

At step 402, input indicative of a selection by the user of a URL contained in a user interface display of an electronic message (which is directed to the user via the electronic messaging service 302) is received. For example, the user interface display can be generated by client application 318, e.g., a browser application displaying the electronic message in a web page of the electronic messaging service 302, an electronic messaging client application (e.g., Outlook®, Yahoo!® Mail, and the like), and the like.

At step 404, an action to be performed is identified. For example, the URL selected by the user can identify an action that is to be performed by the social networking service 312.

Conventionally, the user's selection of the URL causes, in response, a user interface of the social networking service 312 to be displayed, e.g., by a browser client application displaying a web page of the social networking service 312, by a social networking service's (or a third party's social networking service) client application displaying its user interface, etc. As shown in the example of process 400, however, embodiments of the present disclosure circumvent such a conventional response, and automatically transmit, on the user's behalf, a request to the social networking service 312 to perform the action identified using the user-selected URL; and, in response to the URL selection by the user, feedback is provided to the user indicating a status of the request to perform the identified action. For example, the feedback that is provided to the user can include information provided by the social networking service 312 in reply to the request to perform the identified action.

Thus, at step 406 of process 400, a connection is automatically formed with the social networking service 312 on behalf of the user. The connection with the social networking service 312 is formed to transmit a request, on behalf of the user, to the social networking service 312. The request is a request that the social networking service 312 perform the identified action. As is described below, the connection can be made via an API of the social networking service 312, or other service. As is further described, an access token can be supplied (e.g., via the API) as verification that the user authorizes the request that is being made on the user's behalf. In addition, the connection that is formed (e.g., via the API) can be used to receive a reply from the social networking service 312 (or other service) to the request.

At step 408, the request is transmitted to the social networking service 312 using the formed connection. At step 410, a reply to the transmitted request is received from the social networking service 312 via the connection formed with the social networking service 312. At step 412, the user interface is caused to be updated to include to include information in accordance with the reply received from the social networking service 312.

By way of some examples, the user interface (e.g., a user interface provided by a browser application displaying a web page of the electronic messaging service or a user interface provided by a client application to display electronic messages from the electronic messaging service) can be updated to provide an initial update confirming receipt of the user's selection of a prompt, e.g., a "Like" prompt, and to provide a notification that an action, e.g., a "Like" action, is being initiated, on the user's behalf, with the other service, e.g., Facebook®. Then, when a reply is received from the other service, e.g., Facebook®, the user interface can be updated to provide feedback indicating whether or not the action, e.g., the "Like" action, was successfully performed.

As is discussed in more detail below, the connection that is formed at step 406 can be formed between the social networking service 312 and the client-side connection service 320 (and/or the connection service 306). In some embodiments, the client-side connection service 320 forms the connection with the social networking service 312 at step 406, transmits the request to social networking service 312 at step 408, receives the reply from the social networking service at step 410 and causes the user interface of the client application 318 to be updated at step 412 by forwarding the update information to the client application 318. In some embodiments, the connection service 306 forms the connection with the social networking service 312 at step 406, transmits the request to social networking service 312 at step 408, receives the reply from the social networking service at step 410 and causes the user interface to be updated at step 412 by forwarding the update to client application 318 directly or via the client-side connection service 316. In some embodiments and as is discussed in more detail below, the connection service 306 can be in communication with the client-side connection service 316, such that the connection service 306 receives the URL selection from the client application 318 via the client-side connection service 316 and causes the user interface update by forwarding the reply of the social networking service 312 to the client-side connection service, together with an instruction to update the user interface. In some embodiments and as is discussed in more detail below, the client-side connection service 316 can be in communication with the connection service 306 to retrieve a code, which can be used to obtain an access token for use in forming the connection with the social networking service 312.

Figure 5:
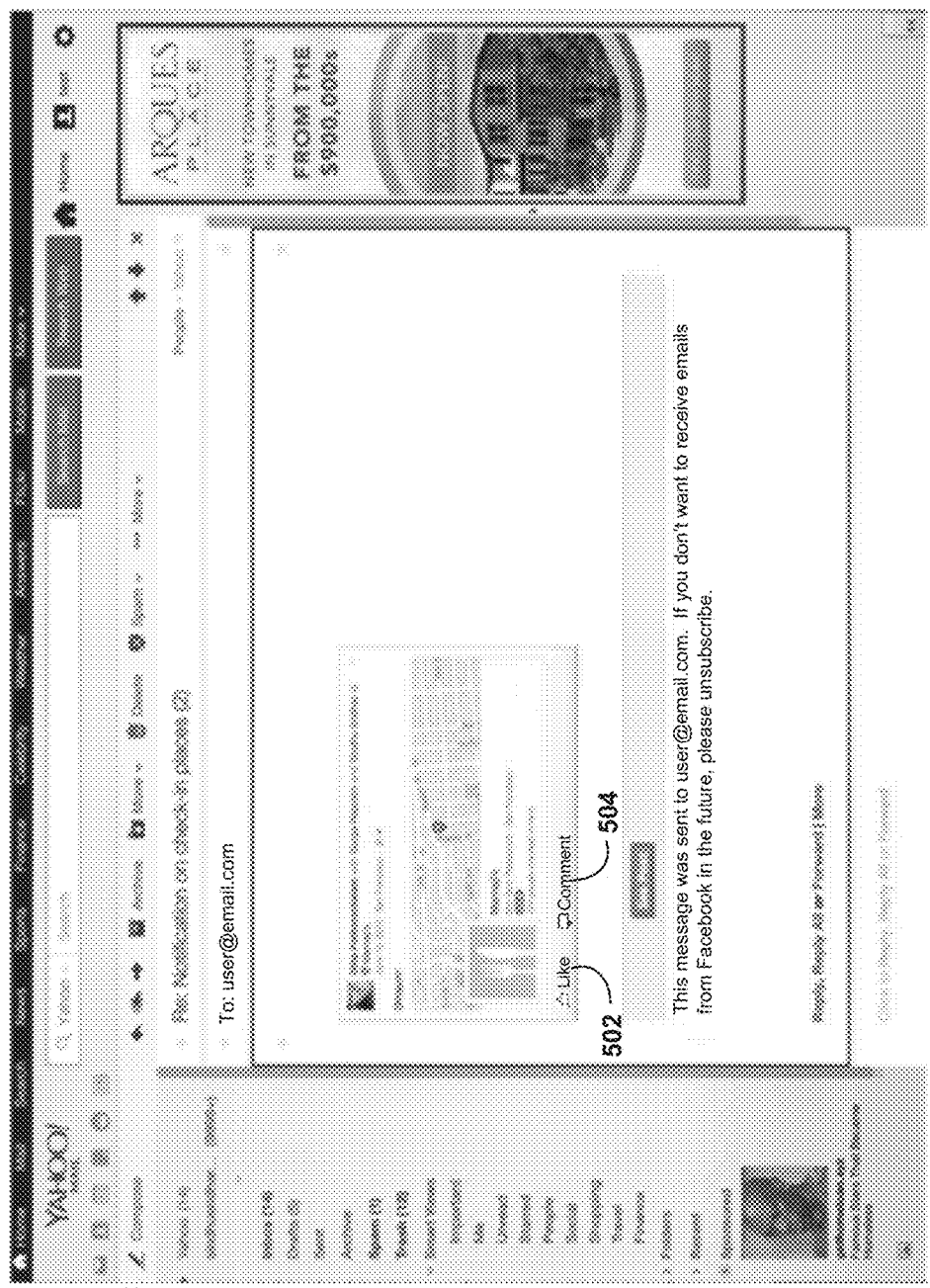

FIG. 5 provides an example of an email directed to a user of an electronic messaging service, such as electronic messaging service 302. The email is being displayed in a user interface of a client application 318, e.g., a browser client application, in communication with the electronic messaging service 302, for example. The email displayed in the browser application's user interface includes two prompts (prompts 502 and 504, selectable by the user).

Prompts 502 and 504 each has an associated URL. In accordance with the novel systems and methods disclosed herein, in response to the user's selection of either prompt 502 or 504. a connection is automatically formed with the social networking service 312, e.g., Facebook® in the example of FIG. 5. The automatically-formed connection is then used to transmit a request to Facebook® to perform the action indicated by the URL corresponding to the selected prompt. A reply is received from Facebook® via the formed connection, and information included in the reply from Facebook® can be provided to the user in a user interface of the client application 318, e.g., a browser application in the example of FIG. 5. In one example, the information can be displayed in a dialog box displayed by the browser application. The information provided in the dialog box, or other user interface widget or element, can notify the user that a request was automatically transmitted to Facebook® to perform the action in response to the user's selection of the prompt, and can further notify the user of a completion status (e.g., success or failure) of the request.

To further illustrate, link 502 contained in the received electronic message displayed in the browser application is a "Like" prompt, e.g., a prompt for the user to "Like" a Facebook® object, e.g., a post. In the conventional approach, the user's selection of the "Like" prompt 502 in the received electronic message results in a Facebook® user interface, such as a web page displayed in a browser application or a user interface of a Facebook® client application, being activated on the user's computing device in response. If the user is not yet logged in, the Facebook® user interface prompts the user to log in before the user is presented with the Facebook® post and a "Like" prompt in the Facebook® user interface.

According to some embodiments, the disclosed systems and methods act on the user's behalf in response to receiving the input indicating the user's selection of the "Like" prompt 502. The connection service automatically makes an automated connection, e.g., via an application programming interface (API), with Facebook®. Using the automated connection, the connection service makes a request for the action to be performed on Facebook®. For example, the connection service transmits a call to a function (e.g., "og.likes") of the API to request performance of the "Like" operation on behalf of the user. The transmitted invocation includes an access token, a long-lived access token, as authorization of the user's permission to request performance of the action on the user's behalf.

Using the automated connection, a reply is received from Facebook®, which provides the connection service with feedback indicating the status of the connection service's request. The connection service causes the user interface (e.g., a user interface provided by a browser application displaying a web page of the electronic messaging service or a client application of the electronic messaging service) to be updated with one or more updates in response to the user's selection of the "Like" prompt. For example, the user interface can be caused to provide an initial update confirming receipt of the user's selection of prompt 502, and to provide a notification that the "Like" action is being initiated, on the user's behalf, with Facebook®. Then, when a reply is received from Facebook®, the user interface can be caused to provide feedback indicating whether or not the "Like" action was successfully performed.

Using the connection service provided in accordance with embodiments of the present disclosure, the user need not be redirected to Facebook®, and the "Like" action requested by the user from within the email is performed automatically by the connection service on the user's behalf with Facebook®. The user can remain engaged with the electronic messaging service while the operation is being performed for the user by the connection service. Furthermore, there is no need for the user to interact with Facebook®, since the connection service interacts with Facebook®, and performs the action, on behalf of the user.

FIG. 6 provides a pseudocode example of a non-limiting embodiment in accordance with some embodiments of the present disclosure. Pseudocode 600 provides an example of a postLike function, which includes a variable definition section 602 and a procedure section 604. In section 602, a variable, accessToken, is defined, and its value is determined using a getUserAccessToken( ) function. In some embodiments, the access token is valid for an extended time frame, e.g., 60 days. The access token can be renewed or a new access token can be obtained. Using Facebook® as an example, a user can authorize an application, e.g., connection service 306 and/or client-side connection service 316, to use the access token to perform actions on behalf of the user; the access token can be obtained as part of the user's log in, or authentication. In some embodiments, once it is obtained, an access token can be saved and associated with the user, e.g., via database 304, 314 and/or database 324. In addition, variable definition section 602 includes code to determine the Facebook® object for the "Like" action. For example, the object can be identified using information, e.g., the href information, contained in the URL associated with the prompt 502.

In the example of FIG. 6, the procedure section 604 is conditionally performed based on whether or not an access token is available, e.g., is identified using the getUserAccessToken( ) procedure. If an access token is available, the og.likes function of the Facebook® API is invoked with the identified object as a parameter, e.g., objectToLike. The reply, e.g., response, received is then processed. In the example, an error message can be displayed if the operation was unsuccessful, or the user can be notified that the "Like" action was successfully completed on the user's behalf.

Figure 7:
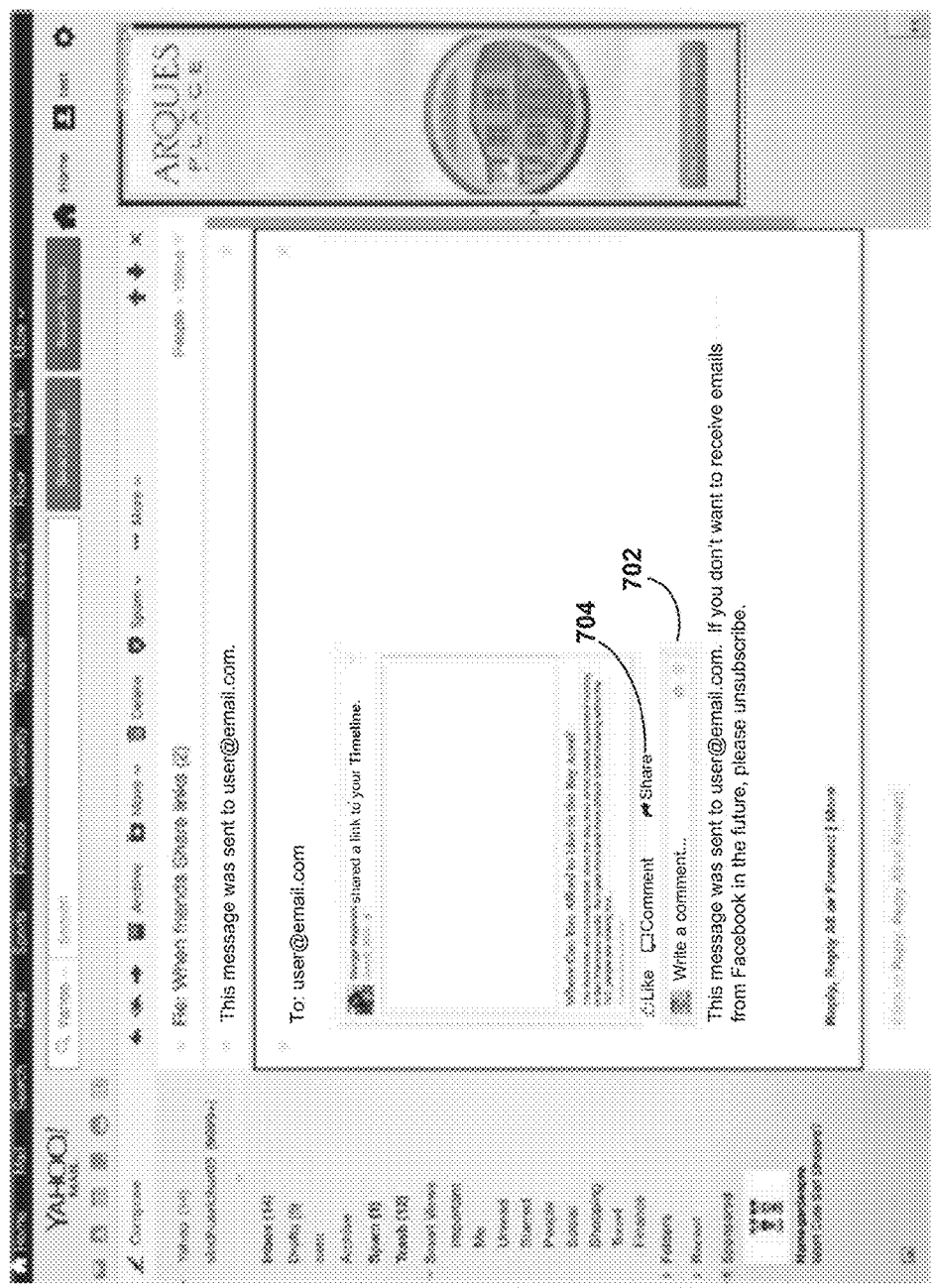

Referring again to FIG. 5, prompt 504 involves a comment action. In this case, in response to the user's selection of prompt 504, the user is prompted to provide a comment. The user-provided comment can be transmitted to Facebook® as a parameter. FIG. 7 provides an example of an email that includes a comment input element 702, which can be used by the user to provide a comment. Like the example of FIG. 5, FIG. 7 also includes "Like" and "Comment" prompts. In addition, FIG. 7 includes a "Share" prompt 704. If selected by the user, in accordance with embodiments, the methods and systems disclosed herein can cause the object identified using the URL associated with the prompt 704 to be shared on Facebook® using an automated connection as described herein.

Figure 8:
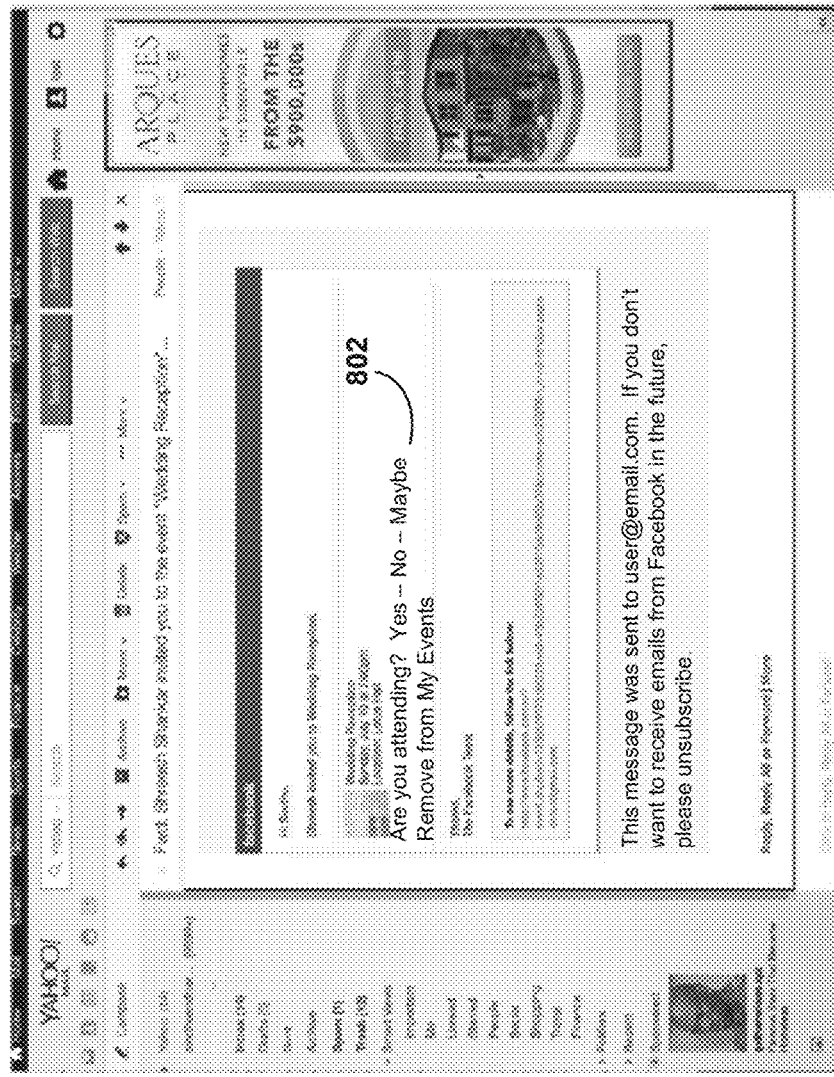

FIG. 8 provides an example of a prompt 802 prompting the user to indicate whether or not the use is planning on attending an event, or alternatively to remove the entry from the user's set of events. If selected by the user, in accordance with embodiments, the methods and systems disclosed herein can remove the event from the user's set of events, or RSVP, (on behalf of the user) for event identified using the URL associated with the prompt 704 using an automated connection formed with Facebook®, as described herein.

Figure 9:
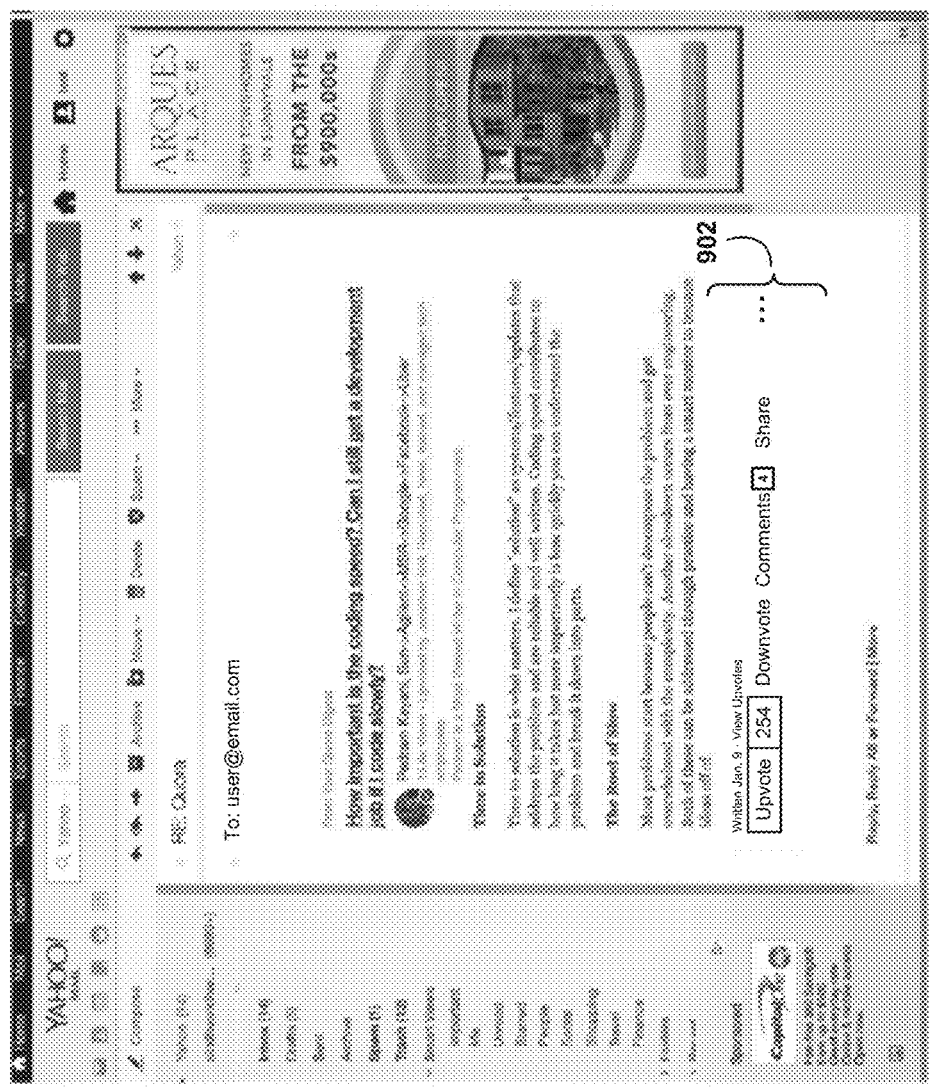

FIG. 9 provides an example of an email involving another service, which is a question and answer service, e.g., Quora®. Section 902 includes a number of prompts, each of which can be processed automatically on behalf of the user by establishing a connection with the service, transmitted a request to perform one or more actions identified using the like associated with the selected prompt, and providing feedback to the user in accordance with the feedback received from the service in reply to the transmitted request, as described herein.

FIG. 10 is a schematic diagram of a component interaction example of a non-limiting embodiment in accordance with some embodiments of the present disclosure. In the example of FIG. 10, the client-side connection service 1020 corresponds to client-side connection service 320, service connection service 1040 corresponds to connection service 306 and the external service 1050 can correspond to social networking service 312. In addition and in the example, the client-side connection service 1020 responds to a user's URL selection in a client application, e.g., client application 318, communicates with connection service 1040 and the external service 1050 to obtain an access token, forms a connection with the external service 1050, uses the formed connection and the access token to request that the external service 1050 perform an action on behalf of the user and receive a reply from the external service 1050, and causes a user interface of a client application, e.g., client application 318 to be updated to reflect the reply.

At step 1022, the client connection service 1020 receives the URL selection of the user. For example, the client connection service 1020 can receive the user's URL selection from client application 318. At step 1024, the client connection service 1020 makes a request to the server connection service 1040 for a code which is to be used by the client connection service 1024 to obtain an access token, e.g., a long-lived access token, from the external service 1050. At step 1042, the server connection service 1040 receives the request from the client connection service 1020, and uses a stored access token from a previous user authentication with the external service 1050 to request the code from the external service 1050.

In some embodiments, the stored access token is obtained when the user previously logged in to the external service 1050. During the previous login, the user provides authorization for the client connection service 1020 and/or the server connection service 1040 to activate functionality of the external service 1050 on the user's behalf. If there is no stored access token for the user, or the access token is invalid or expired, the server connection service 1040 can initiate, via the client connection service 1020 and/or the client application 318, a login process to obtain a valid and unexpired access token via a login process in which the user logs into the external service 1050 and authorizes the client connection service 1020 and/or the server connection service 1040 to activate functionality of the external service 1050 on the user's behalf. The obtained access token can be retained by the server connection service 1040, e.g., via database 304.

At step 1042, the server connection service 1040 transmits the stored access token and a request to the external service 1050 to obtain the code (requested by the client connection service 1020 at step 1024). At step 1052, the external service 1050 receives the request from the server connection service 1040, uses the access token received with the request to generate the requested code, and transmits the requested code to the server connection service 1040. At step 1044, the server connection service 1040 receives the generated code and transmits the received code to the client connection service 1020.

At step 1026, the client connection service 1020 receives the code and transmits the code and a request to the external service 1040 for an access token, e.g., a long-lived access token. At step 1054, the external service 1050 generates the access token and transmits the generated access token to the client connection service 1020. At step 1028, the client connection service 1020 receives the requested access token and transmits the access token with a request to the external service 1050 to perform an action, or actions. As described above, the requested action(s) can be determined using the URL received at step 1022.

In the example, the request transmitted at step 1028 is to an API of the external service 1050, and identifies the function, program, tool, etc. of the external service 1050, that is to perform the requested action(s). With reference to FIG. 6, for example, the request transmitted at step 1028 can identify the og.likes API functionality. In addition, the request can identify an object, or objects, to be acted upon to perform the requested action(s). With reference to FIG. 6, the request identified a Facebook® object to be "Liked".

At step 1056, the API of the external service 1050 receives the request from the client connection service 1020 and transmits a reply to the client connection service 1020. At step 1030, the client connection service 1020 receives the reply from the external service 1050 and causes the client application's user interface to be updated to provide the user with information indicating the status of the action taken on the user's behalf in response to the user's URL selection in the client application's user interface.

FIG. 11 is another schematic diagram of a component interaction example of a non-limiting embodiment in accordance with some embodiments of the present disclosure. In the example of FIG. 11, the server connection service 1140 (rather than the client connection service 1120) invokes the functionality of the external service 1150 to perform the action(s) with the object(s) in accordance with the URL selected by the user in the user interface of the client application 318. In the example of FIG. 11, the client-side connection service 1120 corresponds to client-side connection service 316, service connection service 1140 corresponds to connection service 306 and the external service 1150 can correspond to social networking service 312. In addition and in the example, the client-side connection service 1120 responds to a user's URL selection in the client application 318 by forwarding the URL to the external service 1150, and the server connection service 1140 forms a connection with the external service 1150, uses the access token to request that the external service 1150 perform an action on behalf of the user, receives a reply from the external service 1150 and causes a user interface of a client application 318 to be updated to reflect the reply, by forwarding the reply received from the external service 1150 to the client application 318 via the client connection service 1120.

At step 1122, the client connection service 1120 receives the URL selection of the user. At step 1124, the client connection service 1124 forwards the URL selected by the user to the server connection service 1140. As with server connection service 1040, server connection service 1140 either has an access token from a previous user authentication or initiates a process, e.g., a login process, to obtain an access token.

At step 1144, the server connection service 1140 transmits the access token with a request to the external service 1150 to perform an action, or actions. As described above, the requested action can be determined using the URL received at step 1142. In the example, the request transmitted at step 1144 is to an API of the external service 1150, and identifies the function, program, tool, etc. of the external service 1150, that is to perform the requested action(s).

At step 1152, the API of the external service 1150 receives the request from the server connection service 1140 and returns a reply to the server connection service 1140. At step 1146, the server connection service 1140 receives the reply from the external service 1150 and transmits the reply to the client connection service 1120 to cause the user interface of the client application 318 to be updated to provide the user with information indicating the status of the action taken on the user's behalf in response to the user's URL selection in the client application's user interface. At step 1126, the client connection service 1120 receives the reply and uses the received reply to cause the client application 318 to update the user interface.

An internal architecture will now be described with reference to FIG. 12. As shown in FIG. 12, internal architecture 1200 of a computing device(s), computing system, computing platform, user devices, set-top box, smart TV and the like includes one or more processing units, processors, or processing cores, (also referred to herein as CPUs) 1212, which interface with at least one computer bus 1202. Also interfacing with computer bus 1202 are computer-readable medium, or media, 1206, network interface 1214, memory 1204, e.g., random access memory (RAM), run-time transient memory, read only memory (ROM), media disk drive interface 1220 as an interface for a drive that can read and/or write to media including removable media such as floppy, CD-ROM, DVD, media, display interface 1210 as interface for a monitor or other display device, keyboard interface 1216 as interface for a keyboard, pointing device interface 1218 as an interface for a mouse or other pointing device, and miscellaneous other interfaces not shown individually, such as parallel and serial port interfaces and a universal serial bus (USB) interface.

Memory 1204 interfaces with computer bus 1202 so as to provide information stored in memory 1204 to CPU 1212 during execution of software programs such as an operating system, application programs, device drivers, and software modules that comprise program code, and/or computer executable process steps, incorporating functionality described herein, e.g., one or more of process flows described herein. CPU 1212 first loads computer executable process steps from storage, e.g., memory 1204, computer readable storage medium/media 1206, removable media drive, and/or other storage device. CPU 1212 can then execute the stored process steps in order to execute the loaded computer-executable process steps. Stored data, e.g., data stored by a storage device, can be accessed by CPU 1212 during the execution of computer-executable process steps.

Persistent storage, e.g., medium/media 1206, can be used to store an operating system and one or more application programs. Persistent storage can also be used to store device drivers, such as one or more of a digital camera driver, monitor driver, printer driver, scanner driver, or other device drivers, web pages, content files, playlists and other files.

Persistent storage can further include program modules and data files used to implement one or more embodiments of the present disclosure, e.g., listing selection module(s), targeting information collection module(s), and listing notification module(s), the functionality and use of which in the implementation of the present disclosure are discussed in detail herein.

Network link 1228 typically provides information communication using transmission media through one or more networks to other devices that use or process the information. For example, network link 1228 may provide a connection through local network 1224 to a host computer 1226 or to equipment operated by a Network or Internet Service Provider (ISP) 1230. ISP equipment in turn provides data communication services through the public, worldwide packet-switching communication network of networks now commonly referred to as the Internet 1232.

A computer called a server host 1234 connected to the Internet 1232 hosts a process that provides a service in response to information received over the Internet 1232. For example, server host 1234 hosts a process that provides information representing video data for presentation at display 1210. It is contemplated that the components of system 1200 can be deployed in various configurations within other computer systems, e.g., host and server.

At least some embodiments of the present disclosure are related to the use of computer system 1200 for implementing some or all of the techniques described herein. According to one embodiment, those techniques are performed by computer system 1200 in response to processing unit 1212 executing one or more sequences of one or more processor instructions contained in memory 1204. Such instructions, also called computer instructions, software and program code, may be read into memory 1204 from another computer-readable medium 1206 such as storage device or network link. Execution of the sequences of instructions contained in memory 1204 causes processing unit 1212 to perform one or more of the method steps described herein. In alternative embodiments, hardware, such as ASIC, may be used in place of or in combination with software. Thus, embodiments of the present disclosure are not limited to any specific combination of hardware and software, unless otherwise explicitly stated herein.

The signals transmitted over network link and other networks through communications interface, carry information to and from computer system 1200. Computer system 1200 can send and receive information, including program code, through the networks, among others, through network link and communications interface. In an example using the Internet, a server host transmits program code for a particular application, requested by a message sent from computer, through Internet, ISP equipment, local network and communications interface. The received code may be executed by processor 1202 as it is received, or may be stored in memory 1204 or in storage device or other non-volatile storage for later execution, or both.

For the purposes of this disclosure a module is a software, hardware, or firmware (or combinations thereof) system, process or functionality, or component thereof, that performs or facilitates the processes, features, and/or functions described herein (with or without human interaction or augmentation). A module can include sub-modules. Software components of a module may be stored on a computer readable medium for execution by a processor. Modules may be integral to one or more servers, or be loaded and executed by one or more servers. One or more modules may be grouped into an engine or an application.

For the purposes of this disclosure the term "user", "subscriber" "consumer" or "customer" should be understood to refer to a user of an application or applications as described herein and/or a consumer of data supplied by a data provider. By way of example, and not limitation, the term "user" or "subscriber" can refer to a person who receives data provided by the data or service provider over the Internet in a browser session, or can refer to an automated software application which receives the data and stores or processes the data.

Those skilled in the art will recognize that the methods and systems of the present disclosure may be implemented in many manners and as such are not to be limited by the foregoing exemplary embodiments and examples. In other words, functional elements being performed by single or multiple components, in various combinations of hardware and software or firmware, and individual functions, may be distributed among software applications at either the client level or server level or both. In this regard, any number of the features of the different embodiments described herein may be combined into single or multiple embodiments, and alternate embodiments having fewer than, or more than, all of the features described herein are possible.

Functionality may also be, in whole or in part, distributed among multiple components, in manners now known or to become known. Thus, myriad software/hardware/firmware combinations are possible in achieving the functions, features, interfaces and preferences described herein. Moreover, the scope of the present disclosure covers conventionally known manners for carrying out the described features and functions and interfaces, as well as those variations and modifications that may be made to the hardware or software or firmware components described herein as would be understood by those skilled in the art now and hereafter.

Furthermore, the embodiments of methods presented and described as flowcharts in this disclosure are provided by way of example in order to provide a more complete understanding of the technology. The disclosed methods are not limited to the operations and logical flow presented herein. Alternative embodiments are contemplated in which the order of the various operations is altered and in which sub-operations described as being part of a larger operation are performed independently.

While various embodiments have been described for purposes of this disclosure, such embodiments should not be deemed to limit the teaching of this disclosure to those embodiments. Various changes and modifications may be made to the elements and operations described above to obtain a result that remains within the scope of the systems and processes described in this disclosure.

The invention claimed is:

1. A method comprising:
    providing, at a computing device, a user interface display of an electronic message, the electronic message being directed to a user via an electronic messaging service, the display of the electronic message comprising a display of a user-selectable action of a social networking service, the user-selectable action having a corresponding universal resource locator (URL) identifying the social networking service and the user-selectable action;
    receiving, at the computing device, input from the user via the user interface display, the input indicating a selection by the user of the action;
    automatically forming a connection, via the computing device, with the social networking service and by a connection service of the electronic messaging service, the automatic connection formation further comprising procuring, by the connection service before invoking the determined action, authorization permitting the connection service to access the social networking system to perform the determined action with the social networking service on behalf of the user, the authorization comprising a token;

transmitting, via the computing device and by the connection service using the formed connection between the connection service of the electronic messaging service and the social networking service, a request on behalf of the user, the request comprising a request that the social networking service perform the action selected by the user;

receiving, via the computing device and by the connection service of the electronic messaging service using the formed connection between the connection service and the social networking service, a reply from the social networking service in response to the request that the social networking service perform the action selected by the user; and causing, via the computing device and as a response to the selection by the user of the action in the display of the electronic message presented in the user interface of the electronic messaging service, the user interface to be updated to include information indicative of the reply received from the social networking service.

2. The method of claim 1, the determined action is a "Like" action, of the social networking service, to be performed on an object identified in the URL.

3. The method of claim 1, the electronic message is from a sender that is the social networking service.

4. The method of claim 1, the electronic message is from a sender that is another user of the social networking service.

5. The method of claim 4, the sender is an online merchant and the action is a "Like" action to like the online merchant on the social networking service.

6. The method of claim 1, further comprising:
determining, via the computing device and by the connection service, that the action to be performed with the social networking service is a "comment" action;
causing, via the computing device and by the connection service, display of a prompt for the user to input the comment;
receiving, via the computing device and by the connection service, input from the user in response to the prompt; and
the request transmission further comprising transmitting the input received from the user in response to the prompt with the request requesting that the social networking service perform the determined action.

7. The method of claim 1, the determined action is an "Invite" action, of the social networking service, to be performed on an event object identified in the URL.

8. The method of claim 1, the token comprising a long-lived access token.

9. The method of claim 8, the authorization procurement further comprising:
causing, via the computing device and by the connection service, a login dialog of the social networking service to be displayed as a prompt for the user to log in to the social networking service;
receiving, via the computing device and by the connection service, a short-lived access token from the social networking service;

transmitting, via the computing device and by the connection service, the short-lived access token to a server computer of the electronic messaging service;
receiving, via the computing device, a code from the server computer of the electronic messaging service;
obtaining, via the computing device, the long-lived access token from the social networking service using the received code.

10. The method of claim 9, further comprising:
prior to causing the display of the login dialog of the social networking service:
requesting, via the computing device and by the connection service, the code from the server computer of the electronic messaging service; and
receiving, via the computing device and by the connection service, a response from the server computer of the electronic messaging service indicating that a valid long-lived token is unavailable.

11. The method of claim 1, the automatic invocation of the determined action comprising automatically calling an application programming interface (API) of the social networking service to perform the determined action.

12. The method of claim 11, the action is a voting action of the social networking service.

13. A non-transitory computer-readable storage medium tangibly encoded with computer-executable instructions, that when executed by a processor associated with a computing device, performs a method comprising:
providing a user interface display of an electronic message, the electronic message being directed to a user via an electronic messaging service, the display of the electronic message comprising a display of a user-selectable action of a social networking service, the user-selectable action having a corresponding universal resource locator (URL) identifying the social networking service and the user-selectable action;
receiving input from the user via the user interface display, the input indicating a selection by the user of the action;
automatically forming a connection with the social networking service and by a connection service of the electronic messaging service, the automatic connection formation further comprising procuring, by the connection service before invoking the determined action, authorization permitting the connection service to access the social networking system to perform the determined action with the social networking service on behalf of the user, the authorization comprising a token;
transmitting, by the connection service using the formed connection between the connection service of the electronic messaging service and the social networking service, a request on behalf of the user, the request comprising a request that the social networking service perform the action selected by the user;
receiving, by the connection service of the electronic messaging service using the formed connection between the connection service and the social networking service, a reply from the social networking service in response to the request that the social networking service perform the action selected by the user; and
causing, as a response to the selection by the user of the action in the display of the electronic message presented in the user interface of the electronic messaging service, the user interface to be updated to include information indicative of the reply received from the social networking service.

14. The non-transitory computer-readable storage medium of claim 13, the automatic invocation of the determined action comprising automatically calling an application programming interface (API) of the social networking service to perform the determined action.

15. A computing device comprising:
- a processor;
- a non-transitory storage medium for tangibly storing thereon program logic for execution by the processor, the program logic comprising:
  - providing logic executed by the processor for providing a user interface display of an electronic message, the electronic message being directed to a user via an electronic messaging service, the display of the electronic message comprising a display of a user-selectable action of a social networking service, the user-selectable action having a corresponding universal resource locator (URL) identifying the social networking service and the user-selectable action;
  - receiving logic executed by the processor for receiving input from the user via the user interface display, the input indicating a selection by the user of the action;
  - forming logic executed by the processor for automatically forming a connection with the social networking service and by a connection service of the electronic messaging service, the automatic connection formation further comprising procuring, by the connection service before invoking the determined action, authorization permitting the connection service to access the social networking system to perform the determined action with the social networking service on behalf of the user, the authorization comprising a token;
  - transmitting logic executed by the processor for transmitting, by the connection service using the formed connection between the connection service of the electronic messaging service and the social networking service, a request on behalf of the user, the request comprising a request that the social networking service perform the action selected by the user;
  - receiving logic executed by the processor for receiving, by the connection service of the electronic messaging service using the formed connection between the connection service and the social networking service, a reply from the social networking service in response to the request that the social networking service perform the action selected by the user; and
  - causing logic executed by the processor for causing, as a response to the selection by the user of the action in the display of the electronic message presented in the user interface of the electronic messaging service, the user interface to be updated to include information indicative of the reply received from the social networking service.

16. The non-transitory computer-readable storage medium of claim 13, the token comprising a long-lived access token.

17. The non-transitory computer-readable storage medium of claim 16, the authorization procurement further comprising:
- causing, by the connection service, a login dialog of the social networking service to be displayed as a prompt for the user to log in to the social networking service;
- receiving, by the connection service, a short-lived access token from the social networking service;
- transmitting, by the connection service, the short-lived access token to a server computer of the electronic messaging service;
- receiving a code from the server computer of the electronic messaging service;
- obtaining the long-lived access token from the social networking service using the received code.

18. The non-transitory computer-readable storage medium of claim 17, further comprising:
- prior to causing the display of the login dialog of the social networking service:
  - requesting, by the connection service, the code from the server computer of the electronic messaging service; and
  - receiving, by the connection service, a response from the server computer of the electronic messaging service indicating that a valid long-lived token is unavailable.

* * * * *